(12) United States Patent
Wang et al.

(10) Patent No.: US 10,383,090 B2
(45) Date of Patent: Aug. 13, 2019

(54) DATA SENDING METHOD, USER EQUIPMENT, AND NETWORK DEVICE

(71) Applicant: Huawei Technologies Co., Ltd., Shenzhen, Guangdong (CN)

(72) Inventors: Hong Wang, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/934,859

(22) Filed: Mar. 23, 2018

(65) Prior Publication Data

US 2018/0213509 A1     Jul. 26, 2018

Related U.S. Application Data

(63) Continuation of application No. PCT/CN2015/090836, filed on Sep. 25, 2015.

(51) Int. Cl.
*H04W 72/02* (2009.01)
*H04L 29/08* (2006.01)
*H04W 72/04* (2009.01)
*H04W 76/14* (2018.01)

(52) U.S. Cl.
CPC .......... *H04W 72/02* (2013.01); *H04L 67/325* (2013.01); *H04W 72/0413* (2013.01); *H04W 76/14* (2018.02)

(58) Field of Classification Search
CPC .. H04W 72/02; H04W 72/0413; H04L 67/325
See application file for complete search history.

(56) References Cited

U.S. PATENT DOCUMENTS

| 9,794,950 | B2 * | 10/2017 | Ryu | H04W 72/085 |
| 9,923,834 | B2 * | 3/2018 | Cao | H04W 4/70 |
| 10,028,293 | B2 * | 7/2018 | Han | H04W 72/12 |
| 10,123,201 | B2 * | 11/2018 | Loehr | H04W 72/04 |
| 2015/0271861 | A1 | 9/2015 | Li et al. | |

FOREIGN PATENT DOCUMENTS

| CN | 103841649 A | 6/2014 |
| CN | 104185281 A | 12/2014 |
| WO | 2015021185 A1 | 2/2015 |

OTHER PUBLICATIONS

ASUSTeK,"Discussion of multiple SA transmission in mode 2 D2D communication", 3GPP TSG RAN WG1 Meeting #78bis, Ljubljana, Slovenia, Oct. 6-10, 2014, XP050869904, R1-144287, 4 pages.

(Continued)

*Primary Examiner* — Rasheed Gidado

(57) ABSTRACT

Embodiments of the present disclosure provide a data sending method, user equipment, and a network device. The method includes: receiving, by a network device, first indication information and a resource request message that are sent by user equipment UE; and allocating, by the network device to the UE according to the first indication information and the resource request message, time frequency resources used by the UE to send at least two pieces of second to-be-sent data in a resource scheduling period. According to the method in the embodiments of the present disclosure, data sending efficiency of the UE is improved.

15 Claims, 9 Drawing Sheets

(56) References Cited

OTHER PUBLICATIONS

Huawei, et al."Priority handling based on ProSe Per Packet Priority", 3GPP TSG-RAN WG2 Meeting #91, Beijing, China, Aug. 24-28, 2015, XP051003995, R2-153238, 6 pages.
Qualcomm Incorporated,"LTE Device to Device Proximity Services", 3GPP TSG RAN meeting #66, Maul, USA, Dec. 8-11, 2014, XP050899383, RP-141894, 38 pages.
ETRI,"Further considerations on ProSe BSR", 3GPP TSG-RAN WG2 Meeting #89,Athens, Greece, Feb. 9-13, 2015, XP050935670, R2-150381, 2 pages.
ZTE Corporation; "Priorities for ProSe communication"; 3GPP TSG-RAN WG2 Meeting #90; R2-152558; May 25-29, 2015; 2 pages.
"3rd Generation Partnership Project; Technical Specification Group Radio Access Network; Evolved Universal Terrestrial Radio Access (E-UTRA); Radio Resource Control (RRC); Protocol specification (Release 12)"; 3GPP TS 36.331 V12.7.0; Sep. 2015; 453 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; 3GPP TS 36.300 V13.1.0; Sep. 2015; 254 pages.
"3rd Generation Partnership Project; Technical Specification Group Radio Access Network; Evolved Universal Terrestrial Radio Access (E-UTRA); Medium Access Control (MAC) protocol specification (Release 12)"; 3GPP TS 36.321 V12.7.0; Sep. 2015; 77 pages.
"3rd Generation Partnership Project; Technical Specification Group Radio Access Network; Evolved Universal Terrestrial Radio Access (E-UTRA); Multiplexing and channel coding (Release 12)"; 3GPP TS 36.212 V12.6.0; Sep. 2015; 95 pages.

\* cited by examiner

DATA SENDING METHOD, USER EQUIPMENT, AND NETWORK DEVICE

CROSS-REFERENCE TO RELATED APPLICATIONS

This application is a continuation of International Application No. PCT/CN2015/090836 filed on Sep. 25, 2015, the disclosure of which is hereby incorporated by reference in its entirety.

TECHNICAL FIELD

Embodiments of the present application relate to communications technologies, and in particular, to a data sending method, user equipment, and a network device.

BACKGROUND

A device to device (D2D) communications technology is a technology in which user equipment's can directly communicate with each other. The D2D communications technology is different from a cellular communications technology in that, when user equipment's communicate with each other by using the D2D communications technology, data between the user equipment's does not need to be transmitted by a base station, but is directly transmitted by using an air interface between the user equipment's, so as to reduce a network forwarding latency, and break through a network coverage limitation.

The user equipment (UE) performing communication by using the D2D communications technology is referred to as D2D UE. The D2D UE not only can communicate with a base station in a cellular network, but also can perform D2D communication. A time frequency resource used by the D2D UE to perform D2D communication may be scheduled by the base station in the cellular network.

In the prior art, when the base station schedules a time frequency resource for the D2D UE, the base station schedules only one time frequency resource for the D2D UE in each resource scheduling period. Because one time frequency resource can be used to send data to only one destination address, the D2D UE is capable of sending data to only one destination address in each resource scheduling period. When the D2D UE needs to send D2D data to a new destination address, the D2D UE cannot send the D2D data until a next resource scheduling period.

Therefore, in the prior art, when the D2D UE sends multiple pieces of D2D data, a delay is relatively large, and data sending efficiency of the D2D UE is relatively low.

SUMMARY

Embodiments of the present disclosure provide a data sending method, user equipment, and a network device, to resolve a prior-art technical problem of a relatively large delay and relatively low data sending efficiency of D2D UE when the D2D UE sends multiple pieces of D2D data.

According to a first aspect, an embodiment of the present disclosure provides a data sending method, where the method includes:

receiving, by a network device, first indication information and a resource request message that are sent by user equipment UE, where the first indication information is used to inform the network device that the UE is capable of sending data to at least one destination address in one resource scheduling period by using multiple time frequency resources; the resource request message is used to indicate, to the network device, destination addresses respectively corresponding to multiple pieces of first to-be-sent data of the UE and a data volume of each piece of first to-be-sent data; and the first to-be-sent data includes at least one piece of second to-be-sent data; and allocating, by the network device to the UE according to the first indication information and the resource request message, time frequency resources used by the UE to send at least two pieces of second to-be-sent data in the resource scheduling period.

With reference to the first aspect, in a first possible implementation of the first aspect, the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

With reference to the first aspect or the first possible implementation of the first aspect, in a second possible implementation of the first aspect, the allocating, by the network device to the UE according to the first indication information and the resource request message, time frequency resources used by the UE to send at least two pieces of second to-be-sent data in the resource scheduling period specifically includes:

obtaining, by the network device according to the capability indication information, the preset first maximum quantity of the time frequency resources that can be used by the UE in the resource scheduling period; and allocating, by the network device to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

With reference to the first aspect, in a third possible implementation of the first aspect, the first indication information is resource information, the resource information is used to indicate, to the network device, a second maximum quantity of time frequency resources that can actually be used by the UE in the resource scheduling period, and the second maximum quantity is greater than one.

With reference to the first aspect, in a fourth possible implementation of the first aspect, the first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

With reference to any one of the first aspect to the fourth possible implementation of the first aspect, in a fifth possible implementation of the first aspect, the resource information is information about a quantity of the multiple time frequency resources or information about a quantity of processes for performing D2D data sending by the UE.

With reference to any one of the first aspect to the fifth possible implementation of the first aspect, in a sixth possible implementation of the first aspect, the allocating, by the network device to the UE according to the first indication information and the resource request message, time frequency resources used by the UE to send at least two pieces of second to-be-sent data in the resource scheduling period specifically includes:

allocating, by the network device to the UE according to a minimum value of the second maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

With reference to any one of the first aspect to the sixth possible implementation of the first aspect, in a seventh possible implementation of the first aspect, the resource request message carries the first indication information.

With reference to the first aspect, in an eighth possible implementation of the first aspect, the allocating, by the network device to the UE according to the first indication information and the resource request message, time frequency resources used by the UE to send at least two pieces of second to-be-sent data in the resource scheduling period specifically includes:

sending, by the network device according to the first indication information and the resource request message, second indication information to the UE, and allocating, to the UE, the time frequency resources used by the UE to send the at least two pieces of second to-be-sent data in the resource scheduling period, where the second indication information is used to indicate, to the UE, a mapping relationship between the time frequency resources allocated by the network device to the UE and a first destination address.

According to a second aspect, an embodiment of the present disclosure provides a data sending method, where the method includes:

sending, by user equipment UE, first indication information and a resource request message to a network device, where the first indication information is used to inform the network device that the UE is capable of sending data to at least one destination address in one resource scheduling period by using multiple time frequency resources; the resource request message is used to: indicate, to the network device, destination addresses respectively corresponding to multiple pieces of first to-be-sent data of the UE and a data volume of each piece of first to-be-sent data, and instruct the network device to allocate, to the UE according to the first indication information and the resource request message, time frequency resources used by the UE to send at least two pieces of second to-be-sent data in the resource scheduling period; and the first to-be-sent data includes at least one piece of second to-be-sent data; and receiving, by the UE, the time frequency resources allocated by the network device, and sending the at least two pieces of second to-be-sent data in the resource scheduling period according to the time frequency resources and the destination addresses respectively corresponding to the multiple pieces of first to-be-sent data.

With reference to the second aspect, in a first possible implementation of the second aspect, the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

With reference to the second aspect, in a second possible implementation of the second aspect, the first indication information is resource information, the resource information is used to indicate, to the network device, a second maximum quantity of time frequency resources that can actually be used by the UE in the resource scheduling period, and the second maximum quantity is greater than one.

With reference to the second aspect, in a third possible implementation of the second aspect, the first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

With reference to any one of the second aspect to the third possible implementation of the second aspect, in a fourth possible implementation of the second aspect, the resource information is information about a quantity of the multiple time frequency resources or information about a quantity of processes for performing D2D data sending by the UE.

With reference to any one of the second aspect to the fourth possible implementation of the second aspect, in a fifth possible implementation of the second aspect, each piece of second to-be-sent data is corresponding to a different destination address.

With reference to the second aspect or the first possible implementation of the second aspect, in a sixth possible implementation of the second aspect, when a quantity of the time frequency resources is greater than a second maximum quantity of time frequency resources that can actually be used by the UE in the resource scheduling period, the receiving, by the UE, the time frequency resources allocated by the network device, and sending the at least two pieces of second to-be-sent data in the resource scheduling period according to the time frequency resources and the destination addresses respectively corresponding to the multiple pieces of first to-be-sent data specifically includes:

receiving, by the UE, the time frequency resources allocated by the network device, and selecting first time frequency resources from the time frequency resources according to a sequence in which the network device allocates the time frequency resources and the second maximum quantity; and sending, by the UE, the at least two pieces of second to-be-sent data on the first time frequency resources according to the destination addresses respectively corresponding to the multiple pieces of first to-be-sent data.

With reference to any one of the second aspect to the sixth possible implementation of the second aspect, in a seventh possible implementation of the second aspect, the resource request message carries the first indication information.

With reference to the second aspect, in an eighth possible implementation of the second aspect, the receiving, by the UE, the time frequency resources allocated by the network device, and sending the at least two pieces of second to-be-sent data in the resource scheduling period according to the time frequency resources and the destination addresses respectively corresponding to the multiple pieces of first to-be-sent data specifically includes:

receiving, by the UE, the time frequency resources allocated by the network device and second indication information, and sending the at least two pieces of second to-be-sent data in the resource scheduling period according to the time frequency resources, the destination addresses respectively corresponding to the multiple pieces of first to-be-sent data, and the second indication information, where the second indication information is used to indicate, to the UE, a mapping relationship between the time frequency resources allocated by the network device to the UE and a first destination address.

According to a third aspect, an embodiment of the present disclosure provides a data sending method, where the method includes:

receiving, by a network device, a resource request message sent by user equipment UE, where the resource request message is used to indicate, to the network device, a first destination address of the UE and a data volume of to-be-sent data corresponding to the first destination address;

determining, by the network device according to a preset condition, scheduling time and/or a frequency resource that are/is corresponding to the first destination address; and sending, by the network device, scheduling information to the UE at the determined scheduling time and/or on the determined frequency resource that are/is corresponding to the first destination address, where the scheduling information is used to indicate, to the UE, a time frequency resource of the to-be-sent data corresponding to the first destination address of the UE.

With reference to the third aspect, in a first possible implementation of the third aspect, the preset condition includes a mapping relationship between the first destination address and the scheduling time and/or the frequency resource.

With reference to the third aspect or the first possible implementation of the third aspect, in a second possible implementation of the third aspect, before the sending, by the network device, scheduling information at the determined scheduling time and/or on the determined frequency resource that are/is corresponding to the first destination address, the method further includes:

sending, by the network device, second indication information to the UE, where the second indication information is used to indicate, to the UE, the mapping relationship between the first destination address and the scheduling time and/or the frequency resource.

According to a fourth aspect, an embodiment of the present disclosure provides a data sending method, where the method includes:

sending, by user equipment UE, a resource request message to a network device, where the resource request message is used to indicate, to the network device, a first destination address of the UE and a data volume of to-be-sent data corresponding to the first destination address; and receiving, by the UE, scheduling information sent by the network device, and sending, according to the scheduling information and a preset condition, the to-be-sent data corresponding to the first destination address in a resource scheduling period, where the scheduling information is used to indicate, to the UE, a time frequency resource of the to-be-sent data corresponding to the first destination address of the UE.

With reference to the fourth aspect, in a first possible implementation of the fourth aspect, the preset condition includes a mapping relationship between the first destination address and the scheduling time and/or the frequency resource.

With reference to the fourth aspect or the first possible implementation of the fourth aspect, in a second possible implementation of the fourth aspect, before the receiving, by the UE, scheduling information sent by the network device, the method further includes:

receiving, by the UE, second indication information sent by the network device, where the second indication information is used to indicate, to the UE, the mapping relationship between the first destination address and the scheduling time and/or the frequency resource.

According to a fifth aspect, an embodiment of the present disclosure provides a network device, where the network device includes:

a receiving module, configured to receive first indication information and a resource request message that are sent by user equipment UE, where the first indication information is used to inform the network device that the UE is capable of sending data to at least one destination address in one resource scheduling period by using multiple time frequency resources; the resource request message is used to indicate, to the network device, destination addresses respectively corresponding to multiple pieces of first to-be-sent data of the UE and a data volume of each piece of first to-be-sent data; and the first to-be-sent data includes at least one piece of second to-be-sent data; and a processing module, configured to allocate, to the UE according to the first indication information and the resource request message that are received by the receiving module, time frequency resources used by the UE to send at least two pieces of second to-be-sent data in the resource scheduling period.

With reference to the fifth aspect, in a first possible implementation of the fifth aspect, the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

With reference to the fifth aspect or the first possible implementation of the fifth aspect, in a second possible implementation of the fifth aspect, the processing module is specifically configured to: obtain, according to the capability indication information, the preset first maximum quantity of the time frequency resources that can be used by the UE in the resource scheduling period; and allocate, to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

With reference to the fifth aspect, in a third possible implementation of the fifth aspect, the first indication information is resource information, the resource information is used to indicate, to the network device, a second maximum quantity of time frequency resources that can actually be used by the UE in the resource scheduling period, and the second maximum quantity is greater than one.

With reference to the fifth aspect, in a fourth possible implementation of the fifth aspect, the first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

With reference to any one of the fifth aspect to the fourth possible implementation of the fifth aspect, in a fifth possible implementation of the fifth aspect, the resource information is information about a quantity of the multiple time frequency resources or information about a quantity of processes for performing D2D data sending by the UE.

With reference to any one of the fifth aspect to the fifth possible implementation of the fifth aspect, in a sixth possible implementation of the fifth aspect, the processing module is specifically configured to allocate, to the UE according to a minimum value of the second maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

With reference to any one of the fifth aspect to the sixth possible implementation of the fifth aspect, in a seventh possible implementation of the fifth aspect, the resource request message carries the first indication information.

With reference to the fifth aspect, in an eighth possible implementation of the fifth aspect, the network device further includes a sending module; and the processing module is specifically configured to: instruct, according to the first indication information and the resource request message, the sending module to send second indication information to the UE; and allocate, to the UE, the time frequency resources used by the UE to send the at least two pieces of second to-be-sent data in the resource scheduling period, where the second indication information is used to indicate, to the UE, a mapping relationship between the time frequency resources allocated by the network device to the UE and a first destination address.

According to a sixth aspect, an embodiment of the present disclosure provides user equipment, where the user equipment includes:

a sending module, configured to send first indication information and a resource request message to a network device, where the first indication information is used to inform the network device that the user equipment UE is capable of sending data to at least one destination address in one resource scheduling period by using multiple time frequency resources; the resource request message is used to: indicate, to the network device, destination addresses respectively corresponding to multiple pieces of first to-be-sent data of the UE and a data volume of each piece of first to-be-sent data, and instruct the network device to allocate, to the UE according to the first indication information and the resource request message, time frequency resources used by the UE to send at least two pieces of second to-be-sent data in the resource scheduling period; and the first to-be-sent data includes at least one piece of second to-be-sent data;

a receiving module, configured to receive the time frequency resources allocated by the network device; and a processing module, configured to instruct, according to the time frequency resources received by the receiving module and the destination addresses respectively corresponding to the multiple pieces of first to-be-sent data, the sending module to send the at least two pieces of second to-be-sent data in the resource scheduling period.

With reference to the sixth aspect, in a first possible implementation of the sixth aspect, the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

With reference to the sixth aspect, in a second possible implementation of the sixth aspect, the first indication information is resource information, the resource information is used to indicate, to the network device, a second maximum quantity of time frequency resources that can actually be used by the UE in the resource scheduling period, and the second maximum quantity is greater than one.

With reference to the sixth aspect, in a third possible implementation of the sixth aspect, the first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

With reference to any one of the sixth aspect to the third possible implementation of the sixth aspect, in a fourth possible implementation of the sixth aspect, the resource information is information about a quantity of the multiple time frequency resources or information about a quantity of processes for performing D2D data sending by the UE.

With reference to any one of the sixth aspect to the fourth possible implementation of the sixth aspect, in a fifth possible implementation of the sixth aspect, each piece of second to-be-sent data is corresponding to a different destination address.

With reference to the sixth aspect or the first possible implementation of the sixth aspect, in a sixth possible implementation of the sixth aspect, when a quantity of the time frequency resources is greater than a second maximum quantity of time frequency resources that can actually be used by the UE in the resource scheduling period, the processing module is specifically configured to: select first time frequency resources from the time frequency resources according to a sequence in which the network device allocates the time frequency resources and the second maximum quantity; and instruct, according to the destination addresses respectively corresponding to the multiple pieces of first to-be-sent data, the sending module to send the at least two pieces of second to-be-sent data on the first time frequency resources.

With reference to any one of the sixth aspect to the sixth possible implementation of the sixth aspect, in a seventh possible implementation of the sixth aspect, the resource request message carries the first indication information.

With reference to the sixth aspect, in an eighth possible implementation of the sixth aspect, the receiving module is further configured to receive second indication information; and the processing module is specifically configured to instruct, according to the time frequency resources, the second indication information, and the destination addresses respectively corresponding to the multiple pieces of first to-be-sent data, the sending module to send the at least two pieces of second to-be-sent data in the resource scheduling period, where the second indication information is used to indicate, to the UE, a mapping relationship between the time frequency resources allocated by the network device to the UE and a first destination address.

According to a seventh aspect, an embodiment of the present disclosure provides a network device, where the network device includes:

a receiving module, configured to receive a resource request message sent by user equipment UE, where the resource request message is used to indicate, to the network device, a first destination address of the UE and a data volume of to-be-sent data corresponding to the first destination address;

a processing module, configured to: determine, according to a preset condition, scheduling time and/or a frequency resource that are/is corresponding to the first destination address received by the receiving module; and instruct a sending module to send scheduling information to the UE at the determined scheduling time and/or on the determined frequency resource that are/is corresponding to the first destination address, where the scheduling information is used to indicate, to the UE, a time frequency resource of the to-be-sent data corresponding to the first destination address of the UE; and the sending module, configured to send, according to the scheduling time and/or the frequency resource that are/is corresponding to the first destination address and that are/is determined by the processing module, the scheduling information to the UE at the determined scheduling time and/or on the determined frequency resource that are/is corresponding to the first destination address.

With reference to the seventh aspect, in a first possible implementation of the seventh aspect, the preset condition includes a mapping relationship between the first destination address and the scheduling time and/or the frequency resource.

With reference to the seventh aspect or the first possible implementation of the seventh aspect, in a second possible implementation of the seventh aspect, the sending module is further configured to: before sending the scheduling information at the determined scheduling time and/or on the determined frequency resource that are/is corresponding to the first destination address, send second indication information to the UE, where the second indication information is used to indicate, to the UE, the mapping relationship between the first destination address and the scheduling time and/or the frequency resource.

According to an eighth aspect, an embodiment of the present disclosure provides user equipment, where the user equipment includes:

a sending module, configured to send a resource request message to a network device, where the resource request message is used to indicate, to the network device, a first destination address of the user equipment UE and a data volume of to-be-sent data corresponding to the first destination address; and a receiving module, configured to receive scheduling information sent by the network device, where the scheduling information is used to indicate, to the UE, a time frequency resource of the to-be-sent data corresponding to the first destination address of the UE, where the sending module is further configured to send, according to the scheduling information received by the receiving module and a preset condition, the to-be-sent data corresponding to the first destination address in a resource scheduling period.

With reference to the eighth aspect, in a first possible implementation of the eighth aspect, the preset condition includes a mapping relationship between the first destination address and the scheduling time and/or the frequency resource.

With reference to the eighth aspect or the first possible implementation of the eighth aspect, in a second possible implementation of the eighth aspect, the receiving module is further configured to: before receiving the scheduling information sent by the network device, receive second indication information sent by the network device, where the second indication information is used to indicate, to the UE, the mapping relationship between the first destination address and the scheduling time and/or the frequency resource.

According to a ninth aspect, an embodiment of the present disclosure provides a network device, where the network device includes:

a receiver, configured to receive first indication information and a resource request message that are sent by user equipment UE, where the first indication information is used to inform the network device that the UE is capable of sending data to at least one destination address in one resource scheduling period by using multiple time frequency resources; the resource request message is used to indicate, to the network device, destination addresses respectively corresponding to multiple pieces of first to-be-sent data of the UE and a data volume of each piece of first to-be-sent data; and the first to-be-sent data includes at least one piece of second to-be-sent data; and a processor, configured to allocate, to the UE according to the first indication information and the resource request message that are received by the receiver, time frequency resources used by the UE to send at least two pieces of second to-be-sent data in the resource scheduling period.

With reference to the ninth aspect, in a first possible implementation of the ninth aspect, the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

With reference to the ninth aspect or the first possible implementation of the ninth aspect, in a second possible implementation of the ninth aspect, the processor is specifically configured to: obtain, according to the capability indication information, the preset first maximum quantity of the time frequency resources that can be used by the UE in the resource scheduling period; and allocate, to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

With reference to the ninth aspect, in a third possible implementation of the ninth aspect, the first indication information is resource information, the resource information is used to indicate, to the network device, a second maximum quantity of time frequency resources that can actually be used by the UE in the resource scheduling period, and the second maximum quantity is greater than one.

With reference to the ninth aspect, in a fourth possible implementation of the ninth aspect, the first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

With reference to any one of the ninth aspect to the fourth possible implementation of the ninth aspect, in a fifth possible implementation of the ninth aspect, the resource information is information about a quantity of the multiple time frequency resources or information about a quantity of processes for performing D2D data sending by the UE.

With reference to any one of the ninth aspect to the fifth possible implementation of the ninth aspect, in a sixth possible implementation of the ninth aspect, the processor is specifically configured to allocate, to the UE according to a minimum value of the second maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

With reference to any one of the ninth aspect to the sixth possible implementation of the ninth aspect, in a seventh possible implementation of the ninth aspect, the resource request message carries the first indication information.

With reference to the ninth aspect, in an eighth possible implementation of the ninth aspect, the network device further includes a transmitter; and the processor is specifically configured to: instruct, according to the first indication information and the resource request message, the transmitter to send second indication information to the UE; and allocate, to the UE, the time frequency resources used by the UE to send the at least two pieces of second to-be-sent data in the resource scheduling period, where the second indication information is used to indicate, to the UE, a mapping relationship between the time frequency resources allocated by the network device to the UE and a first destination address.

According to a tenth aspect, an embodiment of the present disclosure provides user equipment, where the user equipment includes:

a transmitter, configured to send first indication information and a resource request message to a network device, where the first indication information is used to inform the network device that the user equipment UE is capable of sending data to at least one destination address in one resource scheduling period by using multiple time frequency resources; the resource request message is used to: indicate, to the network device, destination addresses respectively corresponding to multiple pieces of first to-be-sent data of the UE and a data volume of each piece of first to-be-sent data, and instruct the network device to allocate, to the UE according to the first indication information and the resource request message, time frequency resources used by the UE to send at least two pieces of second to-be-sent data in the resource scheduling period; and the first to-be-sent data includes at least one piece of second to-be-sent data;

a receiver, configured to receive the time frequency resources allocated by the network device; and a processor, configured to instruct, according to the time frequency resources received by the receiver and the destination addresses respectively corresponding to the multiple pieces of first to-be-sent data, the transmitter to send the at least two pieces of second to-be-sent data in the resource scheduling period.

With reference to the tenth aspect, in a first possible implementation of the tenth aspect, the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

With reference to the tenth aspect, in a second possible implementation of the tenth aspect, the first indication information is resource information, the resource information is used to indicate, to the network device, a second maximum quantity of time frequency resources that can actually be used by the UE in the resource scheduling period, and the second maximum quantity is greater than one.

With reference to the tenth aspect, in a third possible implementation of the tenth aspect, the first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

With reference to any one of the tenth aspect to the third possible implementation of the tenth aspect, in a fourth possible implementation of the tenth aspect, the resource information is information about a quantity of the multiple time frequency resources or information about a quantity of processes for performing D2D data sending by the UE.

With reference to any one of the tenth aspect to the fourth possible implementation of the tenth aspect, in a fifth possible implementation of the tenth aspect, each piece of second to-be-sent data is corresponding to a different destination address.

With reference to the tenth aspect or the first possible implementation of the tenth aspect, in a sixth possible implementation of the tenth aspect, when a quantity of the time frequency resources is greater than a second maximum quantity of time frequency resources that can actually be used by the UE in the resource scheduling period, the processor is specifically configured to: select first time frequency resources from the time frequency resources according to a sequence in which the network device allocates the time frequency resources and the second maximum quantity; and instruct, according to the destination addresses respectively corresponding to the multiple pieces of first to-be-sent data, the transmitter to send the at least two pieces of second to-be-sent data on the first time frequency resources.

With reference to any one of the tenth aspect to the sixth possible implementation of the tenth aspect, in a seventh possible implementation of the tenth aspect, the resource request message carries the first indication information.

With reference to the tenth aspect, in an eighth possible implementation of the tenth aspect, the receiver is further configured to receive second indication information; and the processor is specifically configured to instruct, according to the time frequency resources, the second indication information, and the destination addresses respectively corresponding to the multiple pieces of first to-be-sent data, the transmitter to send the at least two pieces of second to-be-sent data in the resource scheduling period, where the second indication information is used to indicate, to the UE, a mapping relationship between the time frequency resources allocated by the network device to the UE and a first destination address.

According to an eleventh aspect, an embodiment of the present disclosure provides a network device, where the network device includes:

a receiver, configured to receive a resource request message sent by user equipment UE, where the resource request message is used to indicate, to the network device, a first destination address of the UE and a data volume of to-be-sent data corresponding to the first destination address;

a processor, configured to: determine, according to a preset condition, scheduling time and/or a frequency resource that are/is corresponding to the first destination address received by the receiver; and instruct a transmitter to send scheduling information to the UE at the determined scheduling time and/or on the determined frequency resource that are/is corresponding to the first destination address, where the scheduling information is used to indicate, to the UE, a time frequency resource of the to-be-sent data corresponding to the first destination address of the UE; and the transmitter, configured to send, according to the scheduling time and/or the frequency resource that are/is corresponding to the first destination address and that are/is determined by the processor, the scheduling information to the UE at the determined scheduling time and/or on the determined frequency resource that are/is corresponding to the first destination address.

With reference to the eleventh aspect, in a first possible implementation of the eleventh aspect, the preset condition includes a mapping relationship between the first destination address and the scheduling time and/or the frequency resource.

With reference to the eleventh aspect or the first possible implementation of the eleventh aspect, in a second possible implementation of the eleventh aspect, the transmitter is further configured to: before sending the scheduling information at the determined scheduling time and/or on the determined frequency resource that are/is corresponding to the first destination address, send second indication information to the UE, where the second indication information is used to indicate, to the UE, the mapping relationship between the first destination address and the scheduling time and/or the frequency resource.

According to a twelfth aspect, an embodiment of the present disclosure provides user equipment, where the user equipment includes:

a transmitter, configured to send a resource request message to a network device, where the resource request message is used to indicate, to the network device, a first destination address of the user equipment UE and a data volume of to-be-sent data corresponding to the first destination address; and a receiver, configured to receive scheduling information sent by the network device, where the scheduling information is used to indicate, to the UE, a time frequency resource of the to-be-sent data corresponding to the first destination address of the UE, where the transmitter is further configured to send, according to the scheduling information received by the receiver and a preset condition, the to-be-sent data corresponding to the first destination address in a resource scheduling period.

With reference to the twelfth aspect, in a first possible implementation of the twelfth aspect, the preset condition includes a mapping relationship between the first destination address and the scheduling time and/or the frequency resource.

With reference to the twelfth aspect or the first possible implementation of the twelfth aspect, in a second possible implementation of the twelfth aspect, the receiver is further configured to: before receiving the scheduling information sent by the network device, receive second indication information sent by the network device, where the second indication information is used to indicate, to the UE, the mapping relationship between the first destination address and the scheduling time and/or the frequency resource.

According to the data sending method, the user equipment, and the network device that are provided in the embodiments of the present disclosure, by receiving the first indication information sent by the UE, the network device can learn that the UE is capable of sending data to at least one destination address in one resource scheduling period by using multiple time frequency resources. Therefore, when the UE informs, by using the resource request message, the network device that the UE has multiple pieces of to-be-sent data, the network device may allocate, to the UE, multiple time frequency resources used in one resource scheduling period, so that the UE is capable of sending data in one resource scheduling period by using the multiple time frequency resources, thereby reducing a data sending delay of the UE, and improving data sending efficiency of the UE.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION

Figure 1:
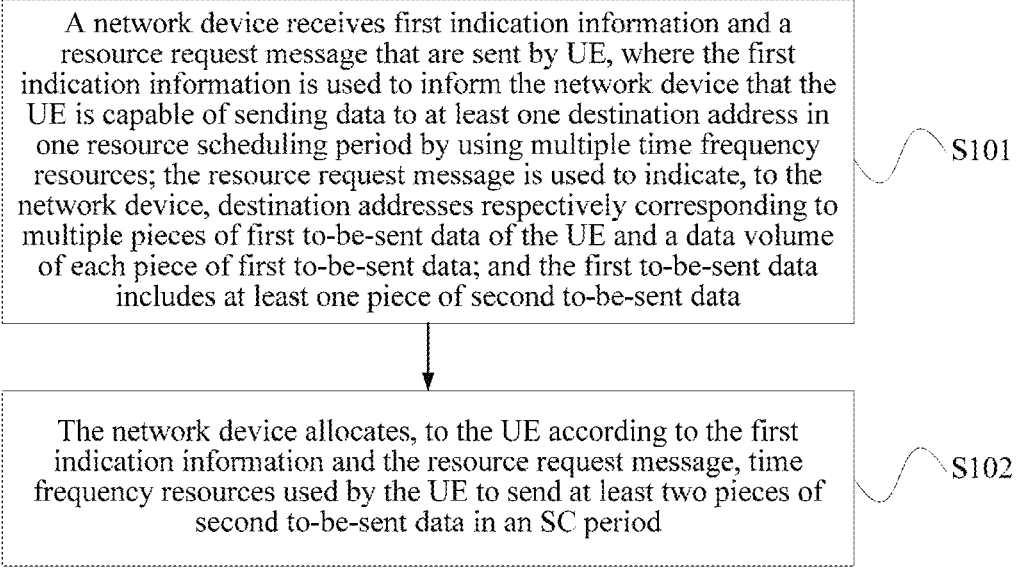
FIG. 1 is a schematic flowchart of Embodiment 1 of a data sending method according to an embodiment of the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

User equipment in the embodiments of the present disclosure, that is, a terminal, may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communication service (PCS,) phone, a cordless telephone set, a Session Initiation Protocol (SIP) phone, a wireless local loop (WLL) station, or a personal digital assistant (PDA). The wireless terminal may alternatively be referred to as a system, a subscriber unit, a subscriber station, a mobile station, a mobile terminal, a remote station, an access point (AP), a remote terminal, an access terminal, a user terminal, a user agent, a user device, or user equipment (UE).

A network device in the embodiments of the present disclosure may be any device in a cellular communications network, for example, a base station (for example, an access point). The base station may be a device that is in an access network and that communicates with a wireless terminal over an air interface by using one or more sectors. The base station may be configured to perform conversion between a received over-the-air frame and an IP packet and serve as a router between the wireless terminal and a remaining portion of the access network. The remaining portion of the access network may include an Internet Protocol (IP) network. The base station may further coordinate attribute management of the air interface. For example, the base station may be a base transceiver station (BTS) in GSM or CDMA, may be a NodeB (NodeB) in WCDMA, or may be an evolved NodeB (NodeB, eNB, or e-NodeB, evolutional Node B) in LTE. This is not limited in the embodiments of the present disclosure.

A method in the embodiments of the present disclosure may be applied to a communications system for device to device (D2D) communication (D2D communications system for short), to resolve a prior-art technical problem of a relatively large delay and relatively low data sending efficiency of UE when the UE sends multiple pieces of D2D data. Certainly, the method in the embodiments of the present disclosure may also be applied to a communications system for machine to machine (M2M) communication, a communications system for vehicle to vehicle communication, and the like.

The following details the technical solutions of the present disclosure by using specific embodiments. The following several specific embodiments may be combined with each other, and a same or similar concept or process may not be described repeatedly in some embodiments.

FIG. 1 is a schematic flowchart of Embodiment 1 of a data sending method according to an embodiment of the present disclosure. Embodiment 1 relates to a specific process in which a network device allocates, to UE according to first indication information sent by the UE, time frequency resources used by the UE in one resource scheduling period, so that the UE is capable of sending at least two pieces of second to-be-sent data in one resource scheduling period. As shown in FIG. 1, the method includes the following steps.

S101: A network device receives first indication information and a resource request message that are sent by UE, where the first indication information is used to inform the network device that the UE is capable of sending data to at least one destination address in one resource scheduling period by using multiple time frequency resources; the resource request message is used to indicate, to the network device, destination addresses respectively corresponding to multiple pieces of first to-be-sent data of the UE and a data volume of each piece of first to-be-sent data; and the first to-be-sent data includes at least one piece of second to-be-sent data.

Specifically, the network device may be any network device that is in a D2D communications system and that allocates, to the UE, time frequency resources used by the UE to perform D2D communication, and the UE may be any UE that has a D2D communication function and that is capable of sending data to at least one destination address in one resource scheduling period by using multiple time frequency resources. That is, the UE is capable of sending multiple pieces of to-be-sent data to one destination address in one resource scheduling period by using multiple time frequency resources, the UE is capable of sending to-be-sent data to multiple destination addresses in one resource scheduling period by using multiple time frequency resources, or the two manners may be combined. This is not limited in this embodiment of the present disclosure. In this embodiment, the UE is in a state that multiple pieces of first to-be-sent data need to be sent, where each piece of first to-be-sent data is corresponding to a destination address, and each piece of to-be-sent data includes at least one piece of second to-be-sent data (the second to-be-sent data mentioned herein is data that can be sent by the UE by using a time frequency resource). A quantity of second to-be-sent data that is specifically included in the first to-be-sent data depends on a quantity of time frequency resources used when the UE sends the first to-be-sent data and a size of each time frequency resource.

Before receiving the resource request message sent by the UE or when receiving the resource request message sent by the UE, the network device may receive the first indication information sent by the UE. The first indication information may be actively sent by the UE to the network device, or may be sent by the UE to the network device after the UE receives a sending capability query message sent by the network device. If the network device receives, when receiving the resource request message sent by the UE, the first indication information sent by the UE, optionally, the UE may separately send the first indication information and the resource request message to the network device, may send the resource request message carrying the first indication information to the network device, or may send a first indication message carrying the resource request message to the network device.

After the network device receives the first indication information sent by the UE, the network device can learn, according to the first indication information, that the UE is capable of sending data to at least one destination address in one resource scheduling period by using multiple time frequency resources. The time frequency resource mentioned herein may be understood as a time frequency resource included in a resource grant (that is, a grant, where the grant may be specifically a sidelink grant in the D2D communications system) sent by the network device to the UE. The resource request message mentioned herein may be a buffer status report (BSR) that is sent by the UE to the network device to request a time frequency resource in the prior art. Details are not elaborated in this embodiment.

It should be noted that, in this embodiment, the resource scheduling period may be a resource scheduling (SA) period in the prior art, or may be a sidelink control (SC) period carrying SA information in the prior art.

S102: The network device allocates, to the UE according to the first indication information and the resource request message, time frequency resources used by the UE to send at least two pieces of second to-be-sent data in one resource scheduling period.

Specifically, after the network device learns, according to the first indication information, that the UE is capable of sending data to at least one destination address in one resource scheduling period by using multiple time frequency resources, the network device may allocate, to the UE according to the destination addresses respectively corresponding to the multiple pieces of first to-be-sent data and the data volume of each piece of first to-be-sent data that are carried in the resource request message, the time frequency resources used by the UE to send the at least two pieces of second to-be-sent data in one resource scheduling period, that is, send, to the UE, at least two grants that can be used in one resource scheduling period, so that the UE is capable of sending at least two pieces of second to-be-sent data in one resource scheduling period by using at least two time frequency resources.

Optionally, the network device may allocate, to the UE according to a quantity of the destination addresses respectively corresponding to the multiple pieces of first to-be-sent data, multiple time frequency resources that can be used in one resource scheduling period and whose quantity is less than or equal to the quantity of the destination addresses respectively corresponding to the multiple pieces of first to-be-sent data. Optionally, the network device may alternatively randomly allocate, to the UE according to a current available time frequency resource of the network device, multiple time frequency resources that can be used in one resource scheduling period.

In the prior art, because the network device does not learn whether the UE is capable of sending data to at least one destination address in one resource scheduling period by using multiple time frequency resources, the network device considers by default that the UE is capable of sending second to-be-sent data (that is, a part or all of one piece of first to-be-sent data) in one resource scheduling period by using only one time frequency resource. In this case, each time the network device allocates a time frequency resource to the UE, the network device allocates only one time frequency resource to the UE in each resource scheduling period. Because one time frequency resource can be used to send a part or all of only one piece of first to-be-sent data, the UE is capable of sending a part or all of only one piece of first to-be-sent data in each resource scheduling period. When the UE needs to send multiple pieces of first to-be-sent data, because the UE is capable of sending a part or all of only one piece of first to-be-sent data in each resource scheduling period, the UE cannot send a part or all of another first to-be-sent data until a next resource scheduling period. As a result, a data sending delay of the UE is relatively large, and sending efficiency is relatively low. However, according to the data sending method provided in this embodiment of the present disclosure, because the network device can learn that the UE is capable of sending data in one resource scheduling period by using multiple time frequency resources, when the UE needs to send multiple pieces of first to-be-sent data, the network device may allocate, to the UE, multiple time frequency resources used in one resource scheduling period, so that the UE is capable of sending multiple pieces of second to-be-sent data (that is, a part or all of the multiple pieces of first to-be-sent data) in one resource scheduling period by using the multiple time frequency resources, thereby reducing a data sending delay of the UE, and improving data sending efficiency of the UE.

According to the data sending method provided in this embodiment of the present disclosure, by receiving the first indication information sent by the UE, the network device can learn that the UE is capable of sending data to at least one destination address in one resource scheduling period by using multiple time frequency resources. Therefore, when the UE informs, by using the resource request message, the network device that the UE has multiple pieces of to-be-sent data, the network device may allocate, to the UE, multiple time frequency resources used in one resource scheduling period, so that the UE is capable of sending data in one resource scheduling period by using the multiple time frequency resources, thereby reducing a data sending delay of the UE, and improving data sending efficiency of the UE.

Further, based on Embodiment 1, Embodiment 2 relates to a specific process of how a network device allocates, to UE according to first indication information and a resource request message, time frequency resources used by the UE to send at least two pieces of second to-be-sent data in one resource scheduling period. S102 specifically includes: sending, by the network device according to the first indication information and the resource request message, second indication information to the UE, and allocating, to the UE, the time frequency resources used by the UE to send the at least two pieces of second to-be-sent data in one resource scheduling period, where the second indication information is used to indicate, to the UE, a mapping relationship between the time frequency resources allocated by the network device to the UE and a first destination address.

Specifically, the second indication information may be sent by the network device to the UE before the network device allocates a time frequency resource to the UE each time, or may be sent by the network device to the UE when the UE is registered with the network device. The second indication information is used to indicate, to the UE, a mapping relationship between a time frequency resource allocated by the network device to the UE and a first destination address. The first destination address is any one of the destination addresses respectively corresponding to the multiple pieces of first to-be-sent data.

When the second indication information is sent by the network device to the UE before the network device allocates a time frequency resource to the UE each time, the mapping relationship may be specifically a mapping relationship between each time frequency resource and the first destination address, may be a mapping relationship between each time frequency resource and an index of the first destination address, may be a mapping relationship between a time point at which the network device sends each time frequency resource to the UE and the first destination address, may be a mapping relationship between a location of each time frequency resource in the resource scheduling period and the first destination address, or may be a mapping relationship between a frequency band to which each time frequency resource belongs and the first destination address.

When the second indication information is sent by the network device to the UE when the UE is registered with the network device, the mapping relationship may be a mapping relationship between each time frequency resource and an index of the first destination address, may be a mapping relationship between a time point at which the network device sends each time frequency resource to the UE and an index of the first destination address, may be a mapping relationship between a location of each time frequency resource in the resource scheduling period and an index of the first destination address, or may be a mapping relationship between a frequency band to which each time frequency resource belongs and an index of the first destination address.

After the network device learns, according to the first indication information, that the UE is capable of sending data to at least one destination address in one resource scheduling period by using multiple time frequency resources, the network device may determine, according to a quantity of current available time frequency resources of the network device, data volumes of first to-be-sent data respectively corresponding to at least two destination addresses in the destination addresses respectively corresponding to the multiple pieces of first to-be-sent data carried in the resource request message (the determined at least two destination addresses are the first destination addresses); allocate, to the UE according to the data volumes of the first to-be-sent data respectively corresponding to the at least two destination addresses, time frequency resources used by the UE to send "a part or all of the at least two pieces of first to-be-sent data (that is, the second to-be-sent data)" in one resource scheduling period; and send the mapping relationship between the allocated time frequency resources and the first destination address to the UE by using the second indication information, so that the UE can use, according to first destination addresses indicated in the second indication information of the network device and a size of a time frequency resource corresponding to each first destination address, a part or all of first to-be-sent data corresponding to the first destination addresses as pieces of second to-be-sent data, and send these pieces of second to-be-sent data in one SC resource scheduling period.

Optionally, in another implementation of this embodiment, the second indication information may alternatively be preset in the network device and the UE, so that the network device can allocate a time frequency resource to the UE according to the preset second indication information, and the UE can use, according to the preset second indication information, the time frequency resource allocated by the network device.

It should be noted that, persons skilled in the art may understand that, the method provided in this embodiment is also applied to a case in which the network device allocates one time frequency resource to the UE. A technical effect achieved in this case is the same as that in this embodiment, and details are not described herein again.

In the prior art, when a resource request message sent by UE to a network device includes destination addresses respectively corresponding to multiple pieces of first to-be-sent data, because the UE does not learn first to-be-sent data corresponding to a data volume according to which the network device allocates a time frequency resource, when the UE uses each time frequency resource allocated by the network device, the UE randomly selects and sends a part or all of one piece of first to-be-sent data from the multiple pieces of first to-be-sent data of the UE. In this case, it is possible that a time frequency resource allocated by the network device includes a relatively large quantity of resource blocks, while a data volume of data sent by the UE by using the time frequency resource is relatively small, and consequently, some resource blocks in the time frequency resource are wasted. However, according to the data sending method provided in this embodiment of the present disclosure, the network device may send, to the UE, the correspondence between the time frequency resource allocated by the network device to the UE and the first destination address, so that after receiving the time frequency resource, the UE can learn, according to the second indication information, first to-be-sent data that is to be partially or entirely sent by using the time frequency resource allocated by the network device, and the UE can send data by correctly using the time frequency resource. This avoids a problem that the time frequency resource is wasted because the UE sends other data by using the time frequency resource.

According to the data sending method provided in this embodiment of the present disclosure, the network device may send the mapping relationship between the time frequency resource allocated to the UE and the first destination address to the UE, so that the UE can send data according to the indication information by properly using the time frequency resource. This avoids a waste of the time frequency resource.

Figure 2:
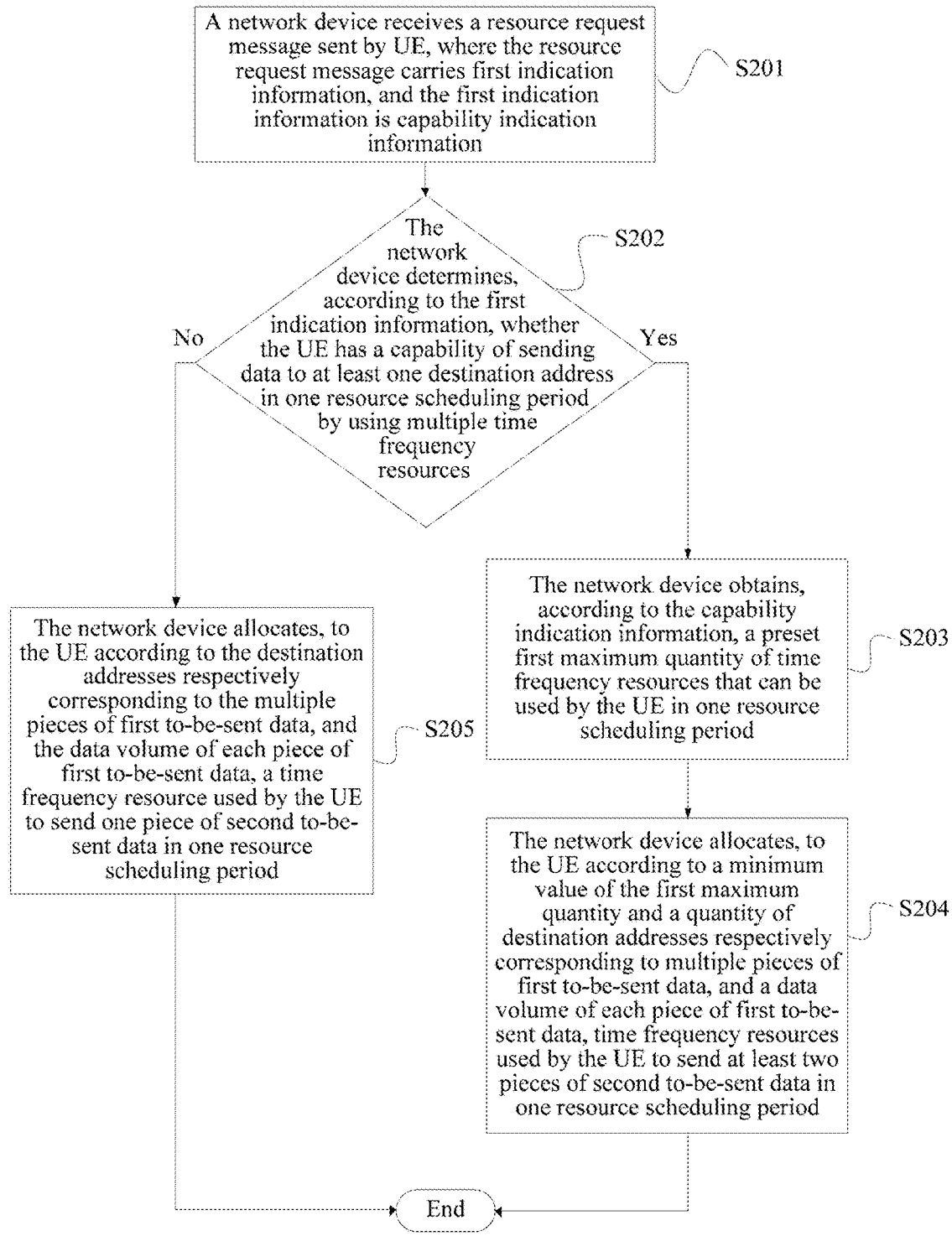
FIG. 2 is a schematic flowchart of Embodiment 3 of a data sending method according to an embodiment of the present disclosure.

FIG. 2 is a schematic flowchart of Embodiment 3 of a data sending method according to an embodiment of the present disclosure. In this embodiment, first indication information is capability indication information, and the capability indication information is used to: inform a network device that UE has a capability of sending data to at least one destination address in one resource scheduling period by using multiple time frequency resources, and instruct the network device to obtain, according to the capability indication information, a preset first maximum quantity of time frequency resources that can be used by the UE in one resource scheduling period. The first indication information may be carried in a resource request message sent by the UE to the network device. Based on Embodiment 1, Embodiment 3 relates to a specific process of how the network device allocates, to the UE according to the capability indication information sent by the UE, time frequency resources used by the UE to send at least two pieces of second to-be-sent data in one resource scheduling period. As shown in FIG. 2, the method includes the following steps.

S201: A network device receives a resource request message sent by UE, where the resource request message carries first indication information, and the first indication information is capability indication information.

Specifically, as described in Embodiment 1, the network device may receive, before receiving the resource request message sent by the UE, the first indication information sent by the UE, or may receive, when receiving the resource request message sent by the UE, the first indication information sent by the UE. In this embodiment, an example in which the network device receives, when receiving the resource request message sent by the UE, the first indication information sent by the UE is used, where the first indication information is carried in the resource request message sent by the UE to the network device.

The first indication information is the capability indication information that is used to: indicate whether the UE has a capability of sending data to at least one destination address in one resource scheduling period by using multiple time frequency resources, and instruct the network device to obtain, according to the capability indication information, a preset first maximum quantity of time frequency resources that can be used by the UE in one resource scheduling period (that is, a preset maximum quantity of grants that can be used by the UE in one resource scheduling period), where the capability indication information may include one or more bits. During specific implementation, to reduce overheads of the resource request message sent by the UE, one bit may be set in the resource request message to serve as the first indication information, and a value of the bit may be 0 or 1. A correspondence of the first indication information may be: 0 indicates that the UE has a capability of sending data to at least one destination address in one resource scheduling period by using multiple time frequency resources, and instructs the network device to obtain, according to the capability indication information, a preset first maximum quantity of time frequency resources that can be used by the UE in one resource scheduling period; and 1 indicates that the UE has no capability of sending data to at least one destination address in one resource scheduling period by using multiple time frequency resources (that is, the UE is capable of sending data in one resource scheduling period by using only one time frequency resource). Alternatively, a correspondence of the first indication information may be: 1 indicates that the UE has a capability of sending data to at least one destination address in one resource scheduling period by using multiple time frequency resources, and instructs the network device to obtain, according to the capability indication information, a preset first maximum quantity of time frequency resources that can be used by the UE in one resource scheduling period; and 0 indicates that the UE has no capability of sending data to at least one destination address in one resource scheduling period by using multiple time frequency resources.

S202: The network device determines, according to the first indication information, whether the UE has a capability of sending data to at least one destination address in one resource scheduling period by using multiple time frequency resources, and if yes, performs S203; if not, performs S205.

Specifically, the correspondence of the capability indication information may be preset in the network device. After receiving the resource request message sent by the UE, the network device may determine, according to the first indication information (that is, the capability indication information) carried in the resource request message, and the correspondence of the capability indication information preset in the network device, whether the UE has the capability of sending data to at least one destination address in one resource scheduling period by using multiple time frequency resources.

For example, it is assumed that the correspondence of the capability indication information preset in the network device is: 0 indicates that the UE has a capability of sending data to at least one destination address in one resource scheduling period by using multiple time frequency resources, and instructs the network device to obtain, according to the capability indication information, a preset first maximum quantity of time frequency resources that can be used by the UE in one resource scheduling period; and 1 indicates that the UE has no capability of sending data to at least one destination address in one resource scheduling period by using multiple time frequency resources. When the first indication information that is sent by the UE and that is received by the network device is 0, the network device determines, according to the first indication information and the preset correspondence of the capability indication information, that the UE has the capability of sending data to at least one destination address in one resource scheduling period by using multiple time frequency resources. When the first indication information that is sent by the UE and that is received by the network device is 1, the network device determines, according to the first indication information and the preset correspondence of the capability indication information, that the UE has no capability of sending data to at least one destination address in one resource scheduling period by using multiple time frequency resources.

S203: The network device obtains, according to the capability indication information, a preset first maximum quantity of time frequency resources that can be used by the UE in one resource scheduling period.

Specifically, when the network device determines, by using the first indication information, that the UE has a capability of sending data to at least one destination address in one resource scheduling period by using multiple time frequency resources, the network device may further obtain the preset first maximum quantity of the time frequency resources that can be used by the UE in one resource scheduling period (that is, a preset maximum quantity of grants that can be used by the UE in one resource scheduling period), where the preset first maximum quantity may be stored in the network device. In this embodiment of the present disclosure, the first maximum quantity is an integer greater than one. During specific implementation, the first maximum quantity may be determined according to resource use frequency and resource occupancy in a network in which the network device is located.

S204: The network device allocates, to the UE according to a minimum value of the first maximum quantity and a quantity of destination addresses respectively corresponding to multiple pieces of first to-be-sent data, and a data volume of each piece of first to-be-sent data, time frequency resources used by the UE to send at least two pieces of second to-be-sent data in one resource scheduling period.

Specifically, the first maximum quantity is a preset maximum quantity of time frequency resources that can be used by the UE in one resource scheduling period (that is, a preset maximum quantity of grants that can be used by the UE in one resource scheduling period).

When the quantity of the destination addresses respectively corresponding to the multiple pieces of first to-be-sent data is greater than the first maximum quantity, that is, when the first maximum quantity is the minimum value, because one time frequency resource is used to send data to one destination address, the network device determines that the UE cannot send "a part or all of first to-be-sent data" respectively corresponding to all destination addresses in one resource scheduling period. In this case, the network device may determine, according to the first maximum quantity and a sequence of the destination addresses respectively corresponding to the multiple pieces of first to-be-sent data carried in the resource request message, some pieces of first to-be-sent data ("a part or all of the determined some pieces of first to-be-sent data" is the second to-be-sent data) in the multiple pieces of first to-be-sent data, where a quantity of the some pieces of first to-be-sent data may be the same as the first maximum quantity. Then, the network device may allocate, to the UE according to data volumes of the some pieces of first to-be-sent data, multiple time frequency resources that can be used by the UE in one resource scheduling period, so that the UE is capable of sending at least two pieces of second to-be-sent data in one resource scheduling period. A quantity of the multiple time frequency resources that are allocated by the network device to the UE and that can be used in one resource scheduling period may be the same as the first maximum quantity. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

When the quantity of the destination addresses respectively corresponding to the multiple pieces of first to-be-sent data is less than or equal to the first maximum quantity, that is, when the quantity of the destination addresses respectively corresponding to the multiple pieces of first to-be-sent data is the minimum value, because one time frequency resource is used to send data to one destination address, the network device determines that the UE is capable of sending "a part or all of first to-be-sent data" respectively corresponding to all destination addresses ("a part or all of the multiple pieces of first to-be-sent data" is the second to-be-sent data) in one resource scheduling period. In this case, the network device may directly allocate, to the UE according to data volumes respectively corresponding to the multiple pieces of first to-be-sent data, a time frequency resource used by the UE to send "a part or all of each piece of first to-be-sent data" in one resource scheduling period, so that the UE is capable of sending at least two pieces of second to-be-sent data in one resource scheduling period. A quantity of the at least two pieces of second to-be-sent data is less than or equal to a quantity of the multiple pieces of first to-be-sent data. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

After S204 is completed, the process ends.

S205: The network device allocates, to the UE according to the destination addresses respectively corresponding to the multiple pieces of first to-be-sent data, and the data volume of each piece of first to-be-sent data, a time frequency resource used by the UE to send one piece of second to-be-sent data in one resource scheduling period.

Specifically, when the network device determines, by using the first indication information, that the UE has no capability of sending data to at least one destination address in one resource scheduling period by using multiple time frequency resources, the network device may determine one piece of first to-be-sent data (a part or all of the determined first to-be-sent data is the second to-be-sent data) in the destination addresses respectively corresponding to the multiple pieces of first to-be-sent data, and allocate, to the UE according to a data volume of the determined first to-be-sent data, a time frequency resource used by the UE to send one piece of second to-be-sent data in one resource scheduling period, so that the UE is capable of sending one piece of second to-be-sent data in one resource scheduling period.

After S205 is completed, the process ends.

According to the data sending method provided in this embodiment of the present disclosure, by receiving the first indication information sent by the UE, the network device can learn that the UE has a capability of sending data to at least one destination address in one resource scheduling period by using multiple time frequency resources. Therefore, when the UE informs, by using the resource request message, the network device that the UE has multiple pieces of to-be-sent data, the network device may properly allocate, to the UE according to the minimum value of the preset first maximum quantity of the time frequency resources that can be used by the UE in one resource scheduling period and the quantity of the destination addresses respectively corresponding to the multiple pieces of first to-be-sent data, multiple time frequency resources used in one resource scheduling period, so that the UE is capable of sending data in one resource scheduling period by using the multiple time frequency resources, thereby reducing a data sending delay of the UE, and improving data sending efficiency of the UE.

Figure 3:
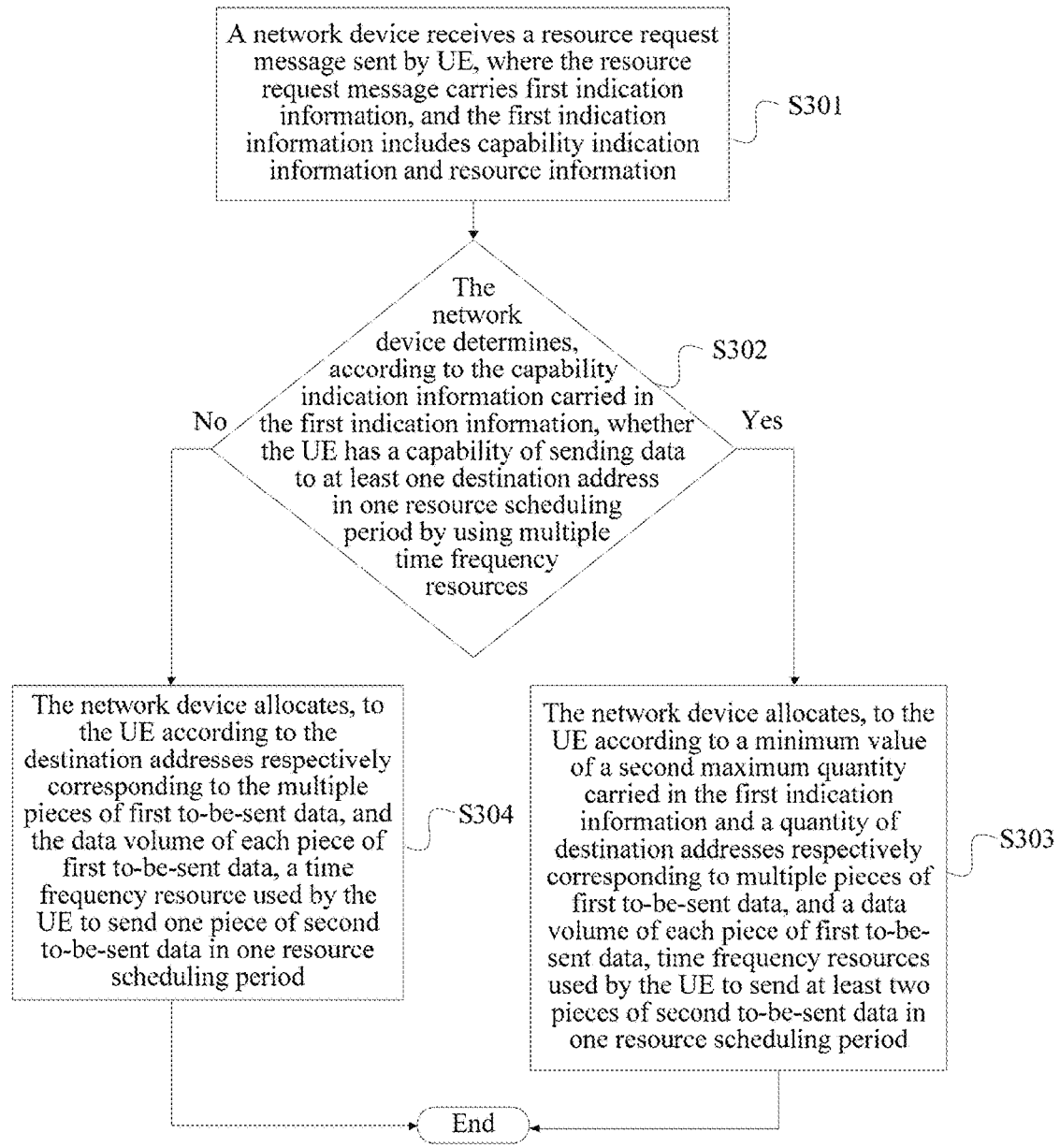
FIG. 3 is a schematic flowchart of Embodiment 4 of a data sending method according to an embodiment of the present disclosure.

FIG. 3 is a schematic flowchart of Embodiment 4 of a data sending method according to an embodiment of the present disclosure. In this embodiment, first indication information includes capability indication information and resource information, the capability indication information is used to inform a network device that UE has a capability of sending data to at least one destination address in one resource scheduling period by using multiple time frequency resources, the resource information is used to indicate, to the network device, a second maximum quantity of time frequency resources that can actually be used by the UE in one resource scheduling period (that is, a maximum quantity of grants that can actually be used by the UE in one resource scheduling period), and the second maximum quantity is an integer greater than one. The first indication information may be carried in a resource request message sent by the UE to the network device. Embodiment 4 relates to a specific process of how the network device allocates, to the UE according to the capability indication information and the resource information that are carried in the first indication information sent by the UE, time frequency resources used by the UE to send at least two pieces of second to-be-sent data in one resource scheduling period. According to the method in this embodiment, data sending efficiency of the UE is greatly improved. As shown in FIG. 3, the method includes the following steps.

S301: A network device receives a resource request message sent by UE, where the resource request message carries first indication information, and the first indication information includes capability indication information and resource information.

Specifically, in this embodiment, the first indication information includes the capability indication information and the resource information, where the capability indication information may include one or more bits, and is used to indicate whether the UE has a capability of sending data to at least one destination address in one resource scheduling period by using multiple time frequency resources; and the resource information may include one or more bits, and is used to indicate, to the network device, a second maximum quantity of time frequency resources that can actually be used by the UE in one resource scheduling period. Optionally, the resource information may be information about a quantity of multiple time frequency resources, that is, information about a quantity of time frequency resources that can actually be used by the UE in one resource scheduling period. Optionally, the resource information may alternatively be information about a quantity of processes for performing D2D data sending by the UE, that is, a quantity of processes for performing D2D data sending by the UE.

For description about the resource request message, refer to S101 of Embodiment 1. Details are not described herein again.

S302: The network device determines, according to the capability indication information carried in the first indication information, whether the UE has a capability of sending data to at least one destination address in one resource scheduling period by using multiple time frequency resources, and if yes, performs S303; if not, performs S304.

Specifically, a correspondence of the capability indication information may be preset in the network device. After receiving the resource request message sent by the UE, the network device may determine, according to the capability indication information included in the first indication information carried in the resource request message, whether the UE has the capability of sending data to at least one destination address in one resource scheduling period by using multiple time frequency resources.

For example, it is assumed that the correspondence of the capability indication information preset in the network device is: 0 indicates that the UE has a capability of sending data to at least one destination address in one resource scheduling period by using multiple time frequency resources, and 1 indicates that the UE has no capability of sending data to at least one destination address in one resource scheduling period by using multiple time frequency resources. When the first indication information that is sent by the UE and that is received by the network device is 0, the network device determines, according to the first indication information and the preset correspondence of the capability indication information, that the UE has the capability of sending data to at least one destination address in one resource scheduling period by using multiple time frequency resources. When the first indication information that is sent by the UE and that is received by the network device is 1, the network device determines, according to the first indication information and the preset correspondence of the capability indication information, that the UE has no capability of sending data to at least one destination address in one resource scheduling period by using multiple time frequency resources.

S303: The network device allocates, to the UE according to a minimum value of a second maximum quantity carried in the first indication information and a quantity of destination addresses respectively corresponding to multiple pieces of first to-be-sent data, and a data volume of each piece of first to-be-sent data, time frequency resources used by the UE to send at least two pieces of second to-be-sent data in one resource scheduling period.

Specifically, the second maximum quantity is a maximum quantity of time frequency resources that can actually be used by the UE in one resource scheduling period (that is, a maximum quantity of grants that can actually be used by the UE in one resource scheduling period).

When the quantity of the destination addresses respectively corresponding to the multiple pieces of first to-be-sent data is greater than the second maximum quantity, that is, when the second maximum quantity is the minimum value, because one time frequency resource is used to send data to one destination address, the network device determines that the UE cannot send "a part or all of first to-be-sent data" respectively corresponding to all destination addresses in one resource scheduling period. In this case, the network device may determine, according to the second maximum quantity and a sequence of the destination addresses respectively corresponding to the multiple pieces of first to-be-sent data carried in the resource request message, some pieces of first to-be-sent data ("a part or all of the determined some pieces of first to-be-sent data" is the second to-be-sent data) in the multiple pieces of first to-be-sent data, where a quantity of the some pieces of first to-be-sent data may be the same as the second maximum quantity. Then, the network device may allocate, to the UE according to data volumes of the some pieces of first to-be-sent data, multiple time frequency resources that can be used by the UE in one resource scheduling period, so that the UE is capable of sending at least two pieces of second to-be-sent data in one resource scheduling period. A quantity of the multiple time frequency resources that are allocated by the network device to the UE and that can be used in one resource scheduling period may be the same as the second maximum quantity. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

When the quantity of the destination addresses respectively corresponding to the multiple pieces of first to-be-sent data is less than or equal to the second maximum quantity, that is, when the quantity of the destination addresses respectively corresponding to the multiple pieces of first to-be-sent data is the minimum value, because one time frequency resource is used to send data to one destination address, the network device determines that the UE is capable of sending "a part or all of first to-be-sent data" corresponding to each destination address, that is, a part or all of each piece of first to-be-sent data ("a part or all of each piece of first to-be-sent data" is the second to-be-sent data) in one resource scheduling period. In this case, the network device may directly allocate, to the UE according to data volumes respectively corresponding to the multiple pieces of first to-be-sent data, a time frequency resource used by the UE to send "a part or all of each piece of first to-be-sent data" in one resource scheduling period, so that the UE is capable of directly sending "a part or all of each piece of first to-be-sent data" in one resource scheduling period. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

After S303 is completed, the process ends.

S304: The network device allocates, to the UE according to the destination addresses respectively corresponding to the multiple pieces of first to-be-sent data, and the data volume of each piece of first to-be-sent data, a time frequency resource used by the UE to send one piece of second to-be-sent data in one resource scheduling period.

Specifically, when the network device determines, by using the first indication information, that the UE has no capability of sending data to at least one destination address in one resource scheduling period by using multiple time frequency resources, the network device may determine one piece of first to-be-sent data (a part or all of the determined first to-be-sent data is the second to-be-sent data) in the destination addresses respectively corresponding to the multiple pieces of first to-be-sent data, and allocate, to the UE according to a data volume of the determined first to-be-sent data, a time frequency resource used by the UE to send one piece of second to-be-sent data in one resource scheduling period, so that the UE is capable of sending one piece of second to-be-sent data in one resource scheduling period.

After S304 is completed, the process ends.

According to the data sending method provided in this embodiment of the present disclosure, by using the capability indication information included in the first indication information, the network device can learn that the UE has a capability of sending data to at least one destination address in one resource scheduling period by using multiple time frequency resources. Moreover, by using the resource information included in the first indication information, the network device can learn the second maximum quantity of the time frequency resources that can actually be used by the UE in one resource scheduling period. Therefore, when the UE indicates, to the network device by using the resource request message, that the UE has multiple pieces of to-be-sent data, the network device may correctly allocate, to the UE according to the minimum value of the second maximum quantity and the quantity of the destination addresses respectively corresponding to the multiple pieces of first to-be-sent data, multiple time frequency resources used in one resource scheduling period, so that the UE is capable of sending data in one resource scheduling period by using the multiple time frequency resources, thereby reducing a data sending delay of the UE, and improving data sending efficiency of the UE.

Optionally, to reduce overheads of the first indication information, in Embodiment 4, the first indication information may alternatively be only resource information, where the resource information is used to indicate, to the network device, a second maximum quantity of time frequency resources that can actually be used by the UE in the resource scheduling period, and the second maximum quantity is greater than one. When the first indication information in Embodiment 4 is the resource information, S302 may be replaced with the following step: The network device determines, according to the resource information, whether the UE has a capability of sending data to at least one destination address in one resource scheduling period by using multiple time frequency resources, and if yes, performs S303; if not, performs S304.

Specifically, the network device may determine, according to the second maximum quantity carried in the resource information, whether the second maximum quantity is greater than one. If yes, it indicates that the UE is capable of sending data in one resource scheduling period by using at least two time frequency resources, and the network device implicitly determines that the UE has a capability of sending data to at least one destination address in one resource scheduling period by using multiple time frequency resources. If not, it indicates that the UE is capable of sending data in one resource scheduling period by using only one time frequency resource, and the network device implicitly determines that the UE has no capability of sending data to at least one destination address in one resource scheduling period by using multiple time frequency resources.

Figure 4:
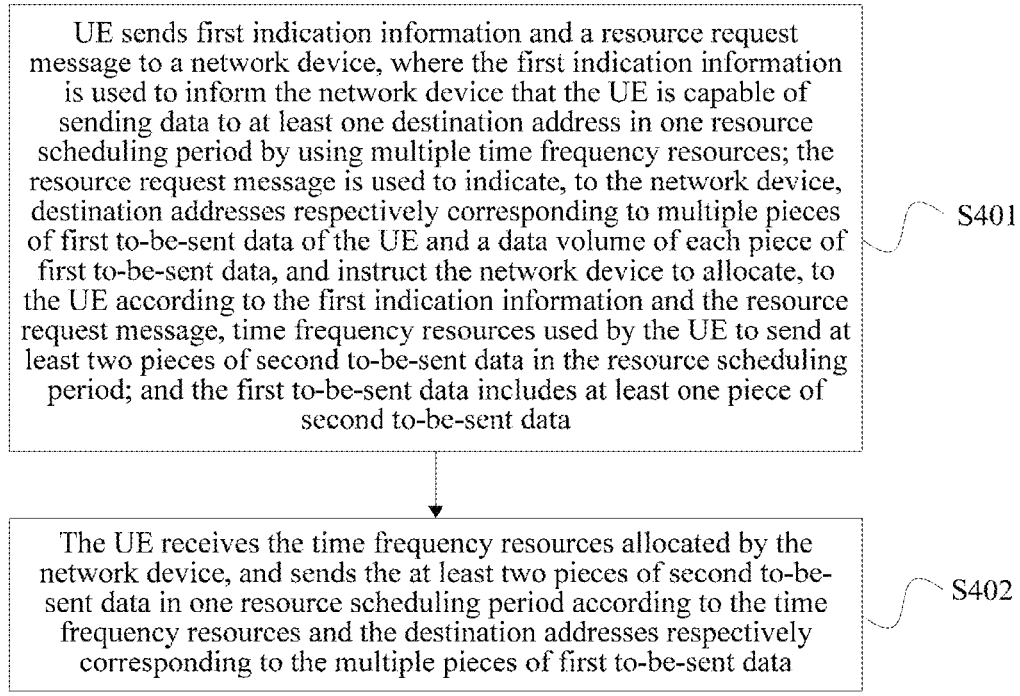
FIG. 4 is a schematic flowchart of Embodiment 5 of a data sending method according to an embodiment of the present disclosure.

FIG. 4 is a schematic flowchart of Embodiment 5 of a data sending method according to an embodiment of the present disclosure. Embodiment 5 relates to a specific process of how UE sends at least two pieces of second to-be-sent data in one resource scheduling period according to time frequency resources allocated by a network device. This embodiment is performed by the UE. As shown in FIG. 4, the method includes the following steps.

S401: UE sends first indication information and a resource request message to a network device, where the first indication information is used to inform the network device that the UE is capable of sending data to at least one destination address in one resource scheduling period by using multiple time frequency resources; the resource request message is used to: indicate, to the network device, destination addresses respectively corresponding to multiple pieces of first to-be-sent data of the UE and a data volume of each piece of first to-be-sent data, and instruct the network device to allocate, to the UE according to the first indication information and the resource request message, time frequency resources used by the UE to send at least two pieces of second to-be-sent data in the resource scheduling period; and the first to-be-sent data includes at least one piece of second to-be-sent data.

Specifically, the UE may be any UE that has a D2D communication function and that is capable of sending data to at least one destination address in one resource scheduling period by using multiple time frequency resources, and the network device may be any network device that is in a D2D communications system and that allocates, to the UE, time frequency resources used by the UE to perform D2D communication. That is, the UE is capable of sending multiple pieces of to-be-sent data to one destination address in one resource scheduling period by using multiple time frequency resources, the UE is capable of sending to-be-sent data to multiple destination addresses in one resource scheduling period by using multiple time frequency resources, or the two manners may be combined. This is not limited in this embodiment of the present disclosure. In this embodiment, the UE is in a state that multiple pieces of first to-be-sent data need to be sent, where each piece of first to-be-sent data is corresponding to a destination address, and each piece of to-be-sent data includes at least one piece of second to-be-sent data (the second to-be-sent data mentioned herein is data that can be sent by the UE by using a time frequency resource). A quantity of second to-be-sent data that is specifically included in the first to-be-sent data depends on a quantity of time frequency resources used when the UE sends the first to-be-sent data and a size of each time frequency resource.

Before sending the resource request message to the network device or when sending the resource request message, the UE may send the first indication information to the network device, so that the network device can learn, according to the first indication information, that the UE is capable of sending data to at least one destination address in one resource scheduling period by using multiple time frequency resources. The first indication information may be actively sent by the UE to the network device, or may be sent by the UE to the network device after the UE receives a sending capability query message sent by the network device. If the network device receives, when receiving the resource request message sent by the UE, the first indication information sent by the UE, optionally, the UE may separately send the first indication information and the resource request message to the network device, may send the resource request message carrying the first indication information to the network device, or may send a first indication message carrying the resource request message to the network device. The foregoing time frequency resource may be understood as a time frequency resource included in a resource grant (that is, a grant, where the grant may be specifically a sidelink grant in the D2D communications system) sent by the network device to the UE. The foregoing resource request message may be a buffer status report (BSR) that is sent by the UE to the network device to request a time frequency resource in the prior art. Details are not elaborated in this embodiment.

After the network device learns, according to the first indication information, that the UE is capable of sending data to at least one destination address in one resource scheduling period by using multiple time frequency resources, the network device may allocate, to the UE according to the destination addresses respectively corresponding to the multiple pieces of first to-be-sent data and the data volume of each piece of first to-be-sent data that are carried in the resource request message, the time frequency resources used by the UE to send the at least two pieces of second to-be-sent data in one resource scheduling period, that is, send, to the UE, at least two grants that can be used in one resource scheduling period, so that the UE is capable of sending at least two pieces of second to-be-sent data in one resource scheduling period by using at least two time frequency resources. The second to-be-sent data mentioned herein is data that can be sent by the UE by using a time frequency resource.

Optionally, the network device may allocate, to the UE according to a quantity of the destination addresses respectively corresponding to the multiple pieces of first to-be-sent data, multiple time frequency resources that can be used in one resource scheduling period and whose quantity is less than or equal to the quantity of the destination addresses respectively corresponding to the multiple pieces of first to-be-sent data. Optionally, the network device may alternatively randomly allocate, to the UE according to a current available time frequency resource of the network device, multiple time frequency resources that can be used in one resource scheduling period.

It should be noted that, in this embodiment, the resource scheduling period may be a resource scheduling (Source Alignment, SA) period in the prior art, or may be a sidelink control (SC) period carrying SA information in the prior art.

S402: The UE receives the time frequency resources allocated by the network device, and sends the at least two pieces of second to-be-sent data in one resource scheduling period according to the time frequency resources and the destination addresses respectively corresponding to the multiple pieces of first to-be-sent data.

Specifically, after the UE receives multiple time frequency resources allocated by the network device, the UE may determine, according to the multiple time frequency resources allocated by the network device, at least two pieces of second to-be-sent data from multiple pieces of first to-be-sent data of the UE, and send the at least two pieces of second to-be-sent data in one resource scheduling period according to destination addresses respectively corresponding to the determined at least two pieces of second to-be-sent data, where a quantity of the at least two pieces of second to-be-sent data selected by the UE may be less than or equal to a quantity of the time frequency resources allocated by the network device.

According to the data sending method provided in this embodiment of the present disclosure, the UE sends the first indication information to the network device, so that the network device can learn that the UE is capable of sending data to at least one destination address in one resource scheduling period by using multiple time frequency resources. Therefore, when the UE informs, by using the resource request message, the network device that the UE has multiple pieces of to-be-sent data, the network device may allocate, to the UE, multiple time frequency resources used in one resource scheduling period, so that the UE is capable of sending data in one resource scheduling period by using the multiple time frequency resources, thereby reducing a data sending delay of the UE, and improving data sending efficiency of the UE.

Further, based on Embodiment 5, Embodiment 6 relates to a specific process of how UE sends, after receiving time frequency resources allocated by a network device, at least two pieces of second to-be-sent data in one resource scheduling period according to the time frequency resources and destination addresses respectively corresponding to multiple pieces of first to-be-sent data. S402 specifically includes: receiving, by the UE, the time frequency resources allocated by the network device and second indication information, and sending the at least two pieces of second to-be-sent data in the resource scheduling period according to the time frequency resources, the destination addresses respectively corresponding to the multiple pieces of first to-be-sent data, and the second indication information, where the second indication information is used to indicate, to the UE, a mapping relationship between the time frequency resources allocated by the network device to the UE and a first destination address.

Specifically, the second indication information may be sent by the network device to the UE before the network device allocates a time frequency resource to the UE each time, or may be sent by the network device to the UE when the UE is registered with the network device. The second indication information is used to indicate, to the UE, a mapping relationship between a time frequency resource allocated by the network device to the UE and a first destination address. The first destination address is any one of the destination addresses respectively corresponding to the multiple pieces of first to-be-sent data.

When the second indication information is sent by the network device to the UE before the network device allocates a time frequency resource to the UE each time, the mapping relationship may be specifically a mapping relationship between each time frequency resource and the first destination address, may be a mapping relationship between each time frequency resource and an index of the first destination address, may be a mapping relationship between a time point at which the network device sends each time frequency resource to the UE and the first destination address, may be a mapping relationship between a location of each time frequency resource in the resource scheduling period and the first destination address, or may be a mapping relationship between a frequency band to which each time frequency resource belongs and the first destination address.

When the second indication information is sent by the network device to the UE when the UE is registered with the network device, the mapping relationship may be a mapping relationship between each time frequency resource and an index of the first destination address, may be a mapping relationship between a time point at which the network device sends each time frequency resource to the UE and an index of the first destination address, may be a mapping relationship between a location of each time frequency resource in the resource scheduling period and an index of the first destination address, or may be a mapping relationship between a frequency band to which each time frequency resource belongs and an index of the first destination address.

After the network device learns, according to the first indication information, that the UE is capable of sending data to at least one destination address in one resource scheduling period by using multiple time frequency resources, the network device may determine, according to a quantity of current available time frequency resources of the network device, data volumes of first to-be-sent data respectively corresponding to at least two destination addresses in the destination addresses respectively corresponding to the multiple pieces of first to-be-sent data carried in the resource request message (the determined at least two destination addresses are the first destination addresses); allocate, to the UE according to the data volumes of the first to-be-sent data respectively corresponding to the at least two destination addresses, time frequency resources used by the UE to send "a part or all of the at least two pieces of first to-be-sent data (that is, the second to-be-sent data)" in one resource scheduling period; and send the mapping relationship between the allocated time frequency resources and the first destination address to the UE by using the second indication information, so that the UE can use, according to first destination addresses indicated in the second indication information of the network device and a size of a time frequency resource corresponding to each first destination address, a part or all of first to-be-sent data corresponding to the first destination addresses as pieces of second to-be-sent data, and send these pieces of second to-be-sent data in one SC resource scheduling period.

Optionally, in another implementation of this embodiment, the second indication information may alternatively be preset in the network device and the UE, so that the network device can allocate a time frequency resource to the UE according to the preset second indication information, and the UE can use, according to the preset second indication information, the time frequency resource allocated by the network device.

It should be noted that, persons skilled in the art may understand that, the method provided in this embodiment is also applied to a case in which the network device allocates one time frequency resource to the UE. A technical effect achieved in this case is the same as that in this embodiment, and details are not described herein again.

According to the data sending method provided in this embodiment of the present disclosure, the UE receives the mapping relationship that is between the time frequency resource allocated by the network device to the UE and the first destination address and that is sent by the network device, so that the UE can send data according to the mapping information by properly using the time frequency resource. This avoids a waste of the time frequency resource.

Further, based on Embodiment 5, in Embodiment 7, the first indication information may be carried in a resource request message, Embodiment 7 relates to a specific process of how UE indicates, to a network device by using the first indication information, that the UE is capable of sending data to at least one destination address in one resource scheduling period by using multiple time frequency resources. There may be specifically three implementations, and details are separately as follows:

First implementation: the first indication information is capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in one resource scheduling period.

Specifically, the first indication information is the capability indication information that is used to: indicate whether the UE has a capability of sending data to at least one destination address in one resource scheduling period by using multiple time frequency resources, and instruct the network device to obtain, according to the capability indication information, a preset first maximum quantity of time frequency resources that can be used by the UE in one resource scheduling period, where the capability indication information may include one or more bits. During specific implementation, to reduce overheads of the resource request message sent by the UE, one bit may be set in the resource request message to serve as the first indication information, and a value of the bit may be 0 or 1. A correspondence of the first indication information may be: 0 indicates that the UE has a capability of sending data to at least one destination address in one resource scheduling period by using multiple time frequency resources, and instructs the network device to obtain, according to the capability indication information, a preset first maximum quantity of time frequency resources that can be used by the UE in one resource scheduling period; and 1 indicates that the UE has no capability of sending data to at least one destination address in one resource scheduling period by using multiple time frequency resources (that is, the UE is capable of sending data in one resource scheduling period by using only one time frequency resource). Alternatively, a correspondence of the first indication information may be: 1 indicates that the UE has a capability of sending data to at least one destination address in one resource scheduling period by using multiple time frequency resources, and instructs the network device to obtain, according to the capability indication information, a preset first maximum quantity of time frequency resources that can be used by the UE in one resource scheduling period; and 0 indicates that the UE has no capability of sending data to at least one destination address in one resource scheduling period by using multiple time frequency resources.

Correspondingly, the correspondence of the capability indication information may be preset in the network device. After the UE sends the first indication information (that is, the capability indication information) to the network device, the network device may determine, according to the first indication information (that is, the capability indication information) and the preset correspondence of the capability indication information, whether the UE has a capability of sending data to at least one destination address in one resource scheduling period by using multiple time frequency resources. After the network device determines that the UE has a capability of sending data to at least one destination address in one resource scheduling period by using multiple time frequency resources, the network device may further obtain the preset first maximum quantity of the time frequency resources that can be used by the UE in one resource scheduling period (that is, a preset maximum quantity of grants that can be used by the UE in one resource scheduling period), so that the network device can allocate, to the UE according to a minimum value of the first maximum quantity and a quantity of destination addresses respectively corresponding to multiple pieces of first to-be-sent data, and a data volume of each piece of first to-be-sent data, time frequency resources used by the UE to send at least two pieces of second to-be-sent data in one resource scheduling period. Therefore, the UE is capable of sending at least two pieces of second to-be-sent data in one resource scheduling period. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

It should be noted that, the preset first maximum quantity may be stored in the network device. In this embodiment of the present disclosure, the first maximum quantity is an integer greater than one. During specific implementation, the first maximum quantity may be determined according to resource use frequency and resource occupancy in a network in which the network device is located.

Second implementation: The first indication information is resource information, where the resource information is used to indicate, to the network device, a second maximum quantity of time frequency resources that can actually be used by the UE in one resource scheduling period, and the second maximum quantity is greater than one.

Specifically, the first indication information may be the resource information, where the resource information may include one or more bits, and is used to indicate, to the network device, a second maximum quantity of time frequency resources that can actually be used by the UE in one resource scheduling period (that is, a maximum quantity of grants that can actually be used by the UE in one resource scheduling period). Optionally, the resource information may be information about a quantity of multiple time frequency resources, that is, information about a quantity of time frequency resources that can actually be used by the UE in one resource scheduling period. Optionally, the resource information may alternatively be information about a quantity of processes for performing D2D data sending by the UE, that is, a quantity of processes for performing D2D data sending by the UE.

After the UE sends the first indication information (that is, the resource information) to the network device, the network device may implicitly determine, according to the first indication information (that is, the resource information), whether the UE has a capability of sending data to at least one destination address in one resource scheduling period by using multiple time frequency resources. Specifically, when the second maximum quantity is greater than one, it indicates that the UE is capable of sending data in one resource scheduling period by using at least two time frequency resources, and the network device determines that the UE has a capability of sending data to at least one destination address in one resource scheduling period by using multiple time frequency resources. When the second maximum quantity is equal to one, it indicates that the UE is capable of sending data in one resource scheduling period by using only one time frequency resource, and the network device determines that the UE has no capability of sending data to at least one destination address in one resource scheduling period by using multiple time frequency resources.

After the network device determines that the UE has a capability of sending data to at least one destination address in one resource scheduling period by using multiple time frequency resources, the network device allocates, to the UE according to a minimum value of the second maximum quantity carried in the first indication information and a quantity of destination addresses respectively corresponding to multiple pieces of first to-be-sent data, and a data volume of each piece of first to-be-sent data, time frequency resources used by the UE to send at least two pieces of second to-be-sent data in one resource scheduling period, so that the UE is capable of sending at least two pieces of second to-be-sent data in one resource scheduling period. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

Third implementation: The first indication information includes capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in one resource scheduling period.

Specifically, the first indication information may include the capability indication information and the resource information, where the capability indication information may include one or more bits, and is used to indicate whether the UE has a capability of sending data to at least one destination address in one resource scheduling period by using multiple time frequency resources; and the resource information may include one or more bits, and is used to indicate, to the network device, a second maximum quantity of time frequency resources that can actually be used by the UE in one resource scheduling period (that is, a maximum quantity of grants that can actually be used by the UE in one resource scheduling period). Optionally, the resource information may be information about a quantity of multiple time frequency resources, that is, a maximum quantity of time frequency resources that can actually be used by the UE in one resource scheduling period. Optionally, the resource information may alternatively be information about a quantity of processes for performing D2D data sending by the UE, that is, a quantity of processes for performing D2D data sending by the UE.

Correspondingly, a correspondence of capability indication information may be preset in the network device. After the UE sends the first indication information to the network device, the network device may determine, according to the capability indication information carried in the first indication information and the preset correspondence of the capability indication information, whether the UE has a capability of sending data to at least one destination address in one resource scheduling period by using multiple time frequency resources. After the network device determines that the UE has a capability of sending data to at least one destination address in one resource scheduling period by using multiple time frequency resources, the network device may further obtain the resource information carried in the first indication information, that is, the second maximum quantity of the time frequency resources that can actually be used by the UE in one resource scheduling period, so that the network device can allocate, to the UE according to a minimum value of the second maximum quantity and a quantity of destination addresses respectively corresponding to multiple pieces of first to-be-sent data, and a data volume of each piece of first to-be-sent data, time frequency resources used by the UE to send at least two pieces of second to-be-sent data in one resource scheduling period. Therefore, the UE is capable of sending at least two pieces of second to-be-sent data in one resource scheduling period. However, in the prior art, the network device allocates, to the UE, only one time frequency resource used by the UE to send one piece of second to-be-sent data in one resource scheduling period, so that the UE is capable of sending only one piece of second to-be-sent data in one resource scheduling period. Therefore, according to the data sending method provided in this embodiment of the present disclosure, data sending efficiency of the UE is improved.

Figure 5:
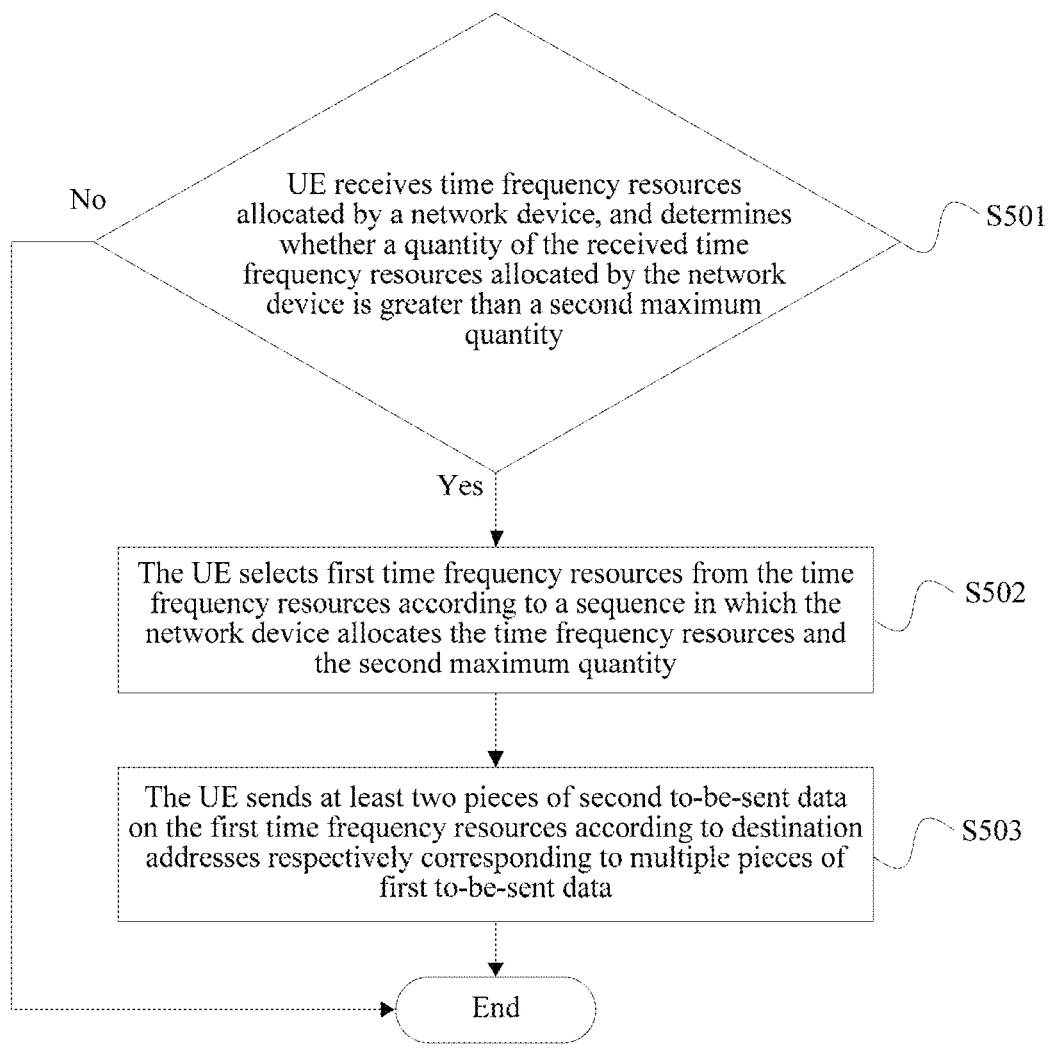
FIG. 5 is a schematic flowchart of Embodiment 8 of a data sending method according to an embodiment of the present disclosure.

FIG. 5 is a schematic flowchart of Embodiment 8 of a data sending method according to an embodiment of the present disclosure. As described in the first implementation of Embodiment 7, when the first indication information sent by the UE to the network device is capability indication information, the network device allocates, to the UE according to the minimum value of the preset first maximum quantity of the time frequency resources that can be used by the UE in one resource scheduling period and the quantity of the destination addresses respectively corresponding to the multiple pieces of first to-be-sent data, and the data volume of each piece of first to-be-sent data, the time frequency resources used by the UE to send the at least two pieces of second to-be-sent data in one resource scheduling period. In this case, because the network device cannot obtain the second maximum quantity of the time frequency resources that can actually be used by the UE in one resource scheduling period, a quantity of time frequency resources that are allocated by the network device to the UE and that are used by the UE in one resource scheduling period may be greater than the second maximum quantity of the time frequency resources that can actually be used by the UE in one resource scheduling period. Therefore, Embodiment 8 relates to a specific process of how UE sends, when a quantity of time frequency resources allocated by a network device is greater than a second maximum quantity of time frequency resources that can actually be used by the UE in one resource scheduling period, at least two pieces of second to-be-sent data in one resource scheduling period according to the time frequency resources allocated by the network device. As shown in FIG. 5, the method includes the following steps.

S501: UE receives time frequency resources allocated by a network device, and determines whether a quantity of the received time frequency resources allocated by the network device is greater than a second maximum quantity, and if yes, performs S502; if not, ends the process.

Specifically, when the UE receives the time frequency resources allocated by the network device, the UE may record the quantity of the received time frequency resources allocated by the network device (that is, a quantity of received grants sent by the network device to the UE in one resource period), and compare the recorded quantity of the received time frequency resources allocated by the network device with a second maximum quantity stored in the UE. If the quantity of the time frequency resources allocated by the network device is greater than the second maximum quantity, it indicates that the quantity of the time frequency resources allocated by the network device is greater than a maximum quantity of time frequency resources that can actually be used by the UE in one resource scheduling period, that is, the UE is capable of sending data in one resource scheduling period by using only some of the time frequency resources allocated by the network device, and S502 is performed. If the quantity of the time frequency resources allocated by the network device is less than or equal to the second maximum quantity, it indicates that the quantity of the time frequency resources allocated by the network device is less than or equal to a maximum quantity of time frequency resources that can actually be used by the UE in one resource scheduling period, that is, the UE is capable of sending data in one resource scheduling period by using all of the time frequency resources allocated by the network device, and the process ends.

S502: The UE selects first time frequency resources from the time frequency resources according to a sequence in which the network device allocates the time frequency resources and the second maximum quantity.

Specifically, when the UE determines that the quantity of the time frequency resources allocated by the network device is greater than a maximum quantity of time frequency resources that can actually be used by the UE in one resource scheduling period, that is, the UE is capable of sending data in one resource scheduling period by using only some of the time frequency resources allocated by the network device, the UE may select the first time frequency resources from the time frequency resources according to the sequence in which the network device allocates the time frequency resources and the second maximum quantity. A quantity of selected first time frequency resources may be less than or equal to the second maximum quantity.

For example, it is assumed that the quantity of the time frequency resources that are allocated by the network device and that are received by the UE is six, and the second maximum quantity of the time frequency resources that can actually be used by the UE in one resource scheduling period is four, where a sequence in which the network device allocates the time frequency resources received by the UE is listed in Table 1:

TABLE 1

| Sequence of time frequency resources allocated by the network device | Time frequency resources allocated by the network device |
| --- | --- |
| 1 | Time frequency resource 1 |
| 2 | Time frequency resource 2 |
| 3 | Time frequency resource 3 |
| 4 | Time frequency resource 4 |
| 5 | Time frequency resource 5 |
| 6 | Time frequency resource 6 |

The UE may select first time frequency resources from multiple time frequency resources in Table 1 according to the sequence in which the network device allocates the time frequency resources in Table 1, that is, the sequence in which the network device allocates the time frequency resources received by the UE, and the second maximum quantity (in this example, the second maximum quantity is four).

Optionally, the UE may use time frequency resources corresponding to 1 to 4 in Table 1 as first time frequency resources, that is, use the time frequency resource 1, the time frequency resource 2, the time frequency resource 3, and the time frequency resource 4 as the first time frequency resources.

Optionally, the UE may use time frequency resources corresponding to 3 to 6 in Table 1 as first time frequency resources, that is, use the time frequency resource 3, the time frequency resource 4, the time frequency resource 5, and the time frequency resource 6 as the first time frequency resources.

Optionally, the UE may use time frequency resources corresponding to 1 to 3 and 6 in Table 1 as first time frequency resources, that is, use the time frequency resource 1, the time frequency resource 2, the time frequency resource 3, and the time frequency resource 6 as the first time frequency resources.

S503: The UE sends at least two pieces of second to-be-sent data on the first time frequency resources according to destination addresses respectively corresponding to multiple pieces of first to-be-sent data.

Specifically, after the UE determines first time frequency resources in the multiple time frequency resources, the UE may determine second to-be-sent data from the multiple pieces of first to-be-sent data according to a quantity of the first time frequency resources, where a quantity of pieces of second to-be-sent data selected by the UE may be the same as the quantity of the first time frequency resources determined by the UE. Then, the UE may allocate one first time frequency resource to each piece of second to-be-sent data, and send, according to a destination address respectively corresponding to each piece of second to-be-sent data, all pieces of second to-be-sent data in one resource scheduling period by using the first time frequency resources.

Optionally, to ensure that each piece of second to-be-sent data sent by the UE can be received by a receiving party to which a destination address belongs, when the UE sends each piece of second to-be-sent data in one resource scheduling period, the UE retransmits each piece of second to-be-sent data multiple times. The UE cannot determine whether second to-be-sent data sent by the UE can be correctly decoded by the receiving party during initial transmission, or correctly decoded by the receiving party after multiple times of retransmission. Therefore, to avoid a case in which data sent by the UE to a same destination address is out of order, when the UE determines second to-be-sent data from the multiple pieces of first to-be-sent data, each determined piece of second to-be-sent data is corresponding to a different destination address. That is, if a piece of first to-be-sent data cannot be sent by using one time frequency resource due to an excessively large data volume, the UE splits the first to-be-sent data into multiple pieces of second to-be-sent data, and sends the multiple pieces of second to-be-sent data in different resource scheduling periods, so that the data sent by the UE to the same destination address may be sequentially received by the receiving party at the same destination address. Optionally, if a piece of first to-be-sent data cannot be sent by using one time frequency resource due to an excessively large data volume, when the UE splits the first to-be-sent data into multiple pieces of second to-be-sent data, the multiple pieces of second to-be-sent data are corresponding to a same destination address and belong to different logical channels. In this case, the UE is capable of sending these pieces of second to-be-sent data corresponding to the same destination address in a same resource period by using multiple time frequency resources, so that the data sent by the UE to the same destination address in the same resource scheduling period may be sequentially received by the receiving party at the same destination address.

After S503 is completed, the process ends.

According to the data sending method provided in this embodiment of the present disclosure, the UE sends the first indication information to the network device, so that the network device can learn that the UE is capable of sending data to at least one destination address in one resource scheduling period by using multiple time frequency resources. Therefore, when the UE informs, by using the resource request message, the network device that the UE has multiple pieces of to-be-sent data, the network device may allocate, to the UE, multiple time frequency resources used in one resource scheduling period, so that the UE is capable of sending data in one resource scheduling period by using the multiple time frequency resources, thereby reducing a data sending delay of the UE, and improving data sending efficiency of the UE.

Figure 6:
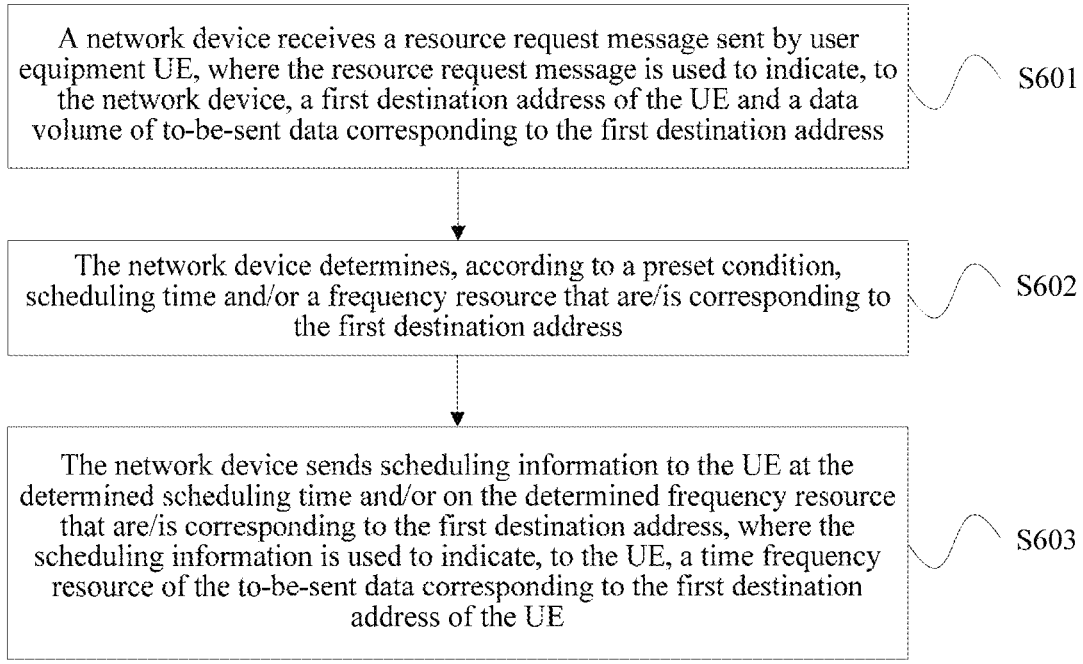
FIG. 6 is a schematic flowchart of Embodiment 9 of a data sending method according to an embodiment of the present disclosure.

FIG. 6 is a schematic flowchart of Embodiment 9 of a data sending method according to an embodiment of the present disclosure. Embodiment 9 relates to a specific process of how a network device allocates time frequency resources to UE according to a preset condition, so that the UE sends data by properly using the time frequency resources. As shown in FIG. 6, the method includes the following steps.

S601: A network device receives a resource request message sent by user equipment UE, where the resource request message is used to indicate, to the network device, a first destination address of the UE and a data volume of to-be-sent data corresponding to the first destination address.

Specifically, the network device may be any network device that is in a D2D communications system and that allocates, to the UE, time frequency resources used by the UE to perform D2D communication, and the UE may be any UE that has a D2D communication function. In this embodiment, the UE is in a state that multiple pieces of to-be-sent data need to be sent, where each piece of to-be-sent data is corresponding to a first destination address. The foregoing resource request message may be a buffer status report (Buffer Status Report, BSR for short) that is sent by the UE to the network device to request a time frequency resource in the prior art. Details are not elaborated in this embodiment.

It should be noted that, the time frequency resource mentioned herein may be understood as a time frequency resource included in a resource grant (that is, a grant, where the grant may be specifically a sidelink grant in the D2D communications system) sent by the network device to the UE.

S602: The network device determines, according to a preset condition, scheduling time and/or a frequency resource that are/is corresponding to the first destination address.

The preset condition may be preset in the network device. Optionally, the preset condition may be a mapping relationship between the first destination address in the resource request message sent by the UE and the scheduling time (the scheduling time is a time point at which the network device sends a resource grant to the UE), may be a mapping relationship between the first destination address in the resource request message sent by the UE and the frequency resource (the frequency resource is a frequency used by the network device to send a resource grant to the UE), may be a mapping relationship between an index of the first destination address in the resource request message sent by the UE and the scheduling time, or may be a mapping relationship between an index of the first destination address in the resource request message sent by the UE and the frequency resource.

After the network device receives the resource request message sent by the UE, the network device may determine, according to a quantity of current available time frequency resources of the network device, the preset condition, and first destination addresses respectively corresponding to multiple pieces of to-be-sent data carried in the resource request message, scheduling time and/or a frequency resource that are/is corresponding to each first destination address, and allocate, according to a data volume corresponding to each destination address, a time frequency resource for to-be-sent data corresponding to each destination address.

S603: The network device sends scheduling information to the UE at the determined scheduling time and/or on the determined frequency resource that are/is corresponding to the first destination address, where the scheduling information is used to indicate, to the UE, a time frequency resource of the to-be-sent data corresponding to the first destination address of the UE.

Specifically, the resource scheduling information may be carried in a resource grant (that is, a grant, where the grant may be specifically a sidelink grant in the D2D communications system) sent by the network device to the UE in the prior art, and is used to indicate, to the UE, the time frequency resource of the to-be-sent data corresponding to the first destination address of the UE.

After the network device determines the scheduling time and/or the frequency resource that are/is corresponding to each first destination address, the network device may send the scheduling information to the UE at the determined scheduling time and/or on the determined frequency resource that are/is corresponding to each first destination address. There may be one or more pieces of scheduling information, and each piece of scheduling information includes a time frequency resource allocated by the network device for to-be-sent data corresponding to one first destination address. Optionally, the same preset condition may also be set in the UE receiving the scheduling information of the network device, so that after receiving the scheduling information sent by the network device, the UE can determine, according to the scheduling information and the preset condition, a first destination address whose corresponding to-be-sent data is sent by using the scheduling information. Therefore, the UE may send, according to a size of a time frequency resource in the scheduling information and the data volume of the to-be-sent data corresponding to the determined first destination address, a part or all of the to-be-sent data corresponding to the first destination address by using the time frequency resource.

Optionally, before S603, the method may further include: sending, by the network device, second indication information to the UE, where the second indication information is used to indicate, to the UE, the mapping relationship between the first destination address and the scheduling time and/or the frequency resource.

Specifically, the second indication information may be sent to the UE before the network device allocates a time frequency resource to the UE each time. Optionally, the second indication information may be carried in a Radio Resource Control (RRC) message, or may be carried in a resource grant (that is, a grant, where the grant may be specifically a sidelink grant in the D2D communications system) message.

If the same preset condition as that in the network device is not set in the UE, the network device may send the mapping relationship between the first destination address and the scheduling time and/or the frequency resource to the UE by using the second indication information, so that after receiving the scheduling information sent by the network device, the UE can determine, according to the scheduling information and the preset condition, a first destination address whose corresponding to-be-sent data is sent by using the scheduling information. Therefore, the UE may send, according to a size of a time frequency resource in the scheduling information and the data volume of the to-be-sent data corresponding to the determined first destination address, a part or all of the to-be-sent data corresponding to the first destination address by using the time frequency resource.

In the prior art, when a resource request message sent by UE to a network device includes first destination addresses respectively corresponding to multiple pieces of to-be-sent data, because the UE does not learn to-be-sent data corresponding to a data volume according to which the network device allocates a time frequency resource, when the UE uses each time frequency resource allocated by the network device, the UE randomly selects and sends a part or all of one piece of to-be-sent data from the multiple pieces of to-be-sent data of the UE. In this case, it is possible that a time frequency resource allocated by the network device includes a relatively large quantity of resource blocks, while a data volume of data sent by the UE by using the time frequency resource is relatively small, and consequently, some resource blocks in the time frequency resource are wasted. However, according to the data sending method provided in this embodiment of the present disclosure, because the mapping relationship between the first destination address and the scheduling time and/or the frequency resource is preset in the network device and the UE, the network device may allocate a time frequency resource to the UE according to the preset mapping relationship. Therefore, after receiving the time frequency resource, the UE can learn, according to the preset mapping relationship, to-be-sent data that is to be partially or entirely sent by using the time frequency resource allocated by the network device, and the UE can send data by correctly using the time frequency resource. This avoids a problem that the time frequency resource is wasted because the UE sends other data by using the time frequency resource.

According to the data sending method provided in this embodiment of the present disclosure, the mapping relationship between the first destination address and the scheduling time and/or the frequency resource is preset in the network device and the UE, and the network device can allocate the time frequency resource to the UE according to the preset mapping relationship, so that the UE can send data according to the preset mapping relationship by properly using the time frequency resource. This avoids a waste of the time frequency resource.

Figure 7:
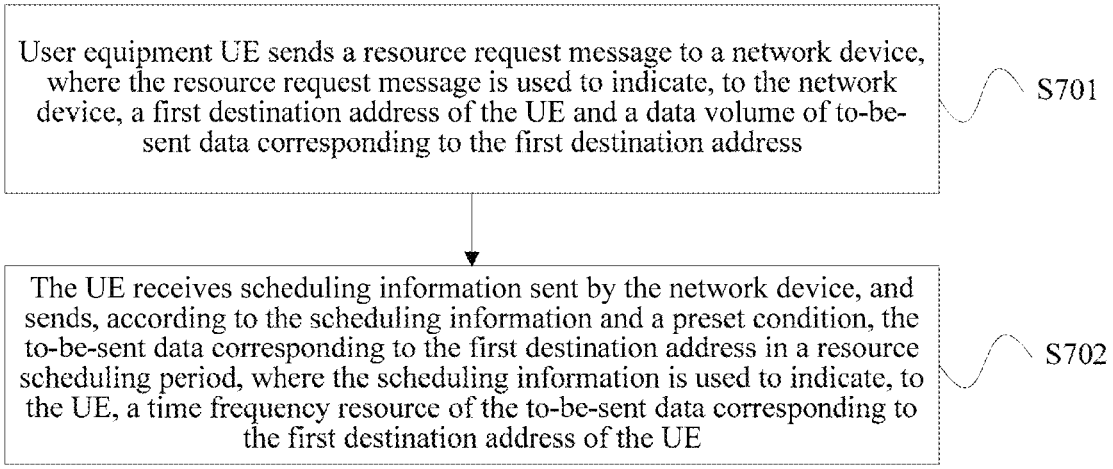
FIG. 7 is a schematic flowchart of Embodiment 10 of a data sending method according to an embodiment of the present disclosure.

FIG. 7 is a schematic flowchart of Embodiment 10 of a data sending method according to an embodiment of the present disclosure. Embodiment 10 relates to a specific process of how UE uses, according to a preset condition, time frequency resources allocated by a network device to the UE, so that the UE sends data by properly using the time frequency resources. As shown in FIG. 7, the method includes the following steps.

S701: User equipment UE sends a resource request message to a network device, where the resource request message is used to indicate, to the network device, a first destination address of the UE and a data volume of to-be-sent data corresponding to the first destination address.

Specifically, the UE may be any UE that has a D2D communication function, and the network device may be any network device that is in a D2D communications system and that allocates, to the UE, time frequency resources used by the UE to perform D2D communication. In this embodiment, the UE is in a state that multiple pieces of to-be-sent data need to be sent, where each piece of to-be-sent data is corresponding to a first destination address. The foregoing resource request message may be a buffer status report (BSR) that is sent by the UE to the network device to request a time frequency resource in the prior art. Details are not elaborated in this embodiment.

It should be noted that, the time frequency resource mentioned herein may be understood as a time frequency resource included in a resource grant (that is, a grant, where the grant may be specifically a sidelink grant in the D2D communications system) sent by the network device to the UE.

A preset condition may be preset in the network device. Optionally, the preset condition may be a mapping relationship between the first destination address in the resource request message sent by the UE and scheduling time (the scheduling time is a time point at which the network device sends a resource grant to the UE), may be a mapping relationship between the first destination address in the resource request message sent by the UE and a frequency resource (the frequency resource is a frequency used by the network device to send a resource grant to the UE), may be a mapping relationship between an index of the first destination address in the resource request message sent by the UE and scheduling time, or may be a mapping relationship between an index of the first destination address in the resource request message sent by the UE and a frequency resource.

After the UE sends the resource request message to the network device, the network device may determine, according to a quantity of current available time frequency resources of the network device, the preset condition, and first destination addresses respectively corresponding to multiple pieces of to-be-sent data carried in the resource request message, scheduling time and/or a frequency resource that are/is corresponding to each first destination address, allocate, according to a data volume corresponding to each destination address, a time frequency resource for to-be-sent data corresponding to each destination address, and send scheduling information at the determined scheduling time and/or on the determined frequency resource that are/is corresponding to each first destination address. There may be one or more pieces of scheduling information, and each piece of scheduling information includes a time frequency resource allocated by the network device for to-be-sent data corresponding to one first destination address. The resource scheduling information may be carried in a resource grant (that is, a grant, where the grant may be specifically a sidelink grant in the D2D communications system) sent by the network device to the UE in the prior art, and is used to indicate, to the UE, the time frequency resource of the to-be-sent data corresponding to the first destination address of the UE.

S702: The UE receives scheduling information sent by the network device, and sends, according to the scheduling information and a preset condition, the to-be-sent data corresponding to the first destination address in a resource scheduling period, where the scheduling information is used to indicate, to the UE, a time frequency resource of the to-be-sent data corresponding to the first destination address of the UE.

In this embodiment, a preset condition is preset in the UE, and if the preset condition is the same as the preset condition preset in the network device, after receiving the scheduling information sent by the network device, the UE may determine, according to the scheduling information and the preset condition, a first destination address whose corresponding to-be-sent data is sent by using the scheduling information. Therefore, the UE may send, according to a size of a time frequency resource in the scheduling information and the data volume of the to-be-sent data corresponding to the determined first destination address, a part or all of the to-be-sent data corresponding to the first destination address by using the time frequency resource.

In another implementation of the present disclosure, a preset condition may not be set in the UE. Optionally, before S702, the method may further include: receiving, by the UE, second indication information sent by the network device, where the second indication information is used to indicate, to the UE, the mapping relationship between the first destination address and the scheduling time and/or the frequency resource.

Specifically, the second indication information may be sent to the UE before the network device allocates a time frequency resource to the UE each time. Optionally, the second indication information may be carried in a Radio Resource Control (RRC) message, or may be carried in a resource grant (that is, a grant, where the grant may be specifically a sidelink grant in the D2D communications system) message.

If the same preset condition as that in the network device is not set in the UE, the network device may send the mapping relationship between the first destination address and the scheduling time and/or the frequency resource to the UE by using the second indication information, so that after receiving the scheduling information sent by the network device, the UE can determine, according to the scheduling information and the preset condition, a first destination address whose corresponding to-be-sent data is sent by using the scheduling information. Therefore, the UE may send, according to a size of a time frequency resource in the scheduling information and the data volume of the to-be-sent data corresponding to the determined first destination address, a part or all of the to-be-sent data corresponding to the first destination address by using the time frequency resource.

According to the data sending method provided in this embodiment of the present disclosure, the UE receives the mapping relationship that is between the time frequency resource allocated by the network device to the UE and the first destination address and that is sent by the network device, so that the UE can send data according to the mapping information by properly using the time frequency resource. This avoids a waste of the time frequency resource.

According to the data sending method provided in this embodiment of the present disclosure, the mapping relationship between the first destination address and the scheduling time and/or the frequency resource is preset in the UE and the network device, and the network device can allocate the time frequency resource to the UE according to the preset mapping relationship, so that the UE can send data according to the preset mapping relationship by properly using the time frequency resource. This avoids a waste of the time frequency resource.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The storage medium includes: any medium that can store program code, such as a ROM, a RAM, a magnetic disk, or an optical disc.

Figure 8:
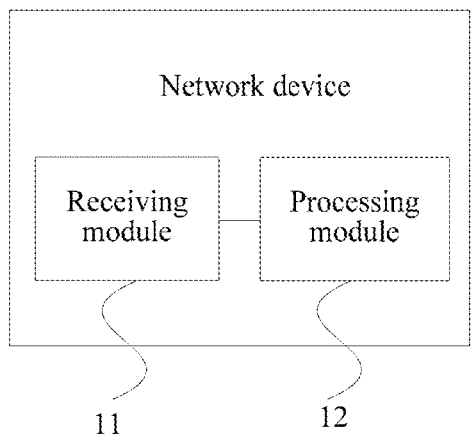
FIG. 8 is a schematic structural diagram of Embodiment 1 of a network device according to an embodiment of the present disclosure.

FIG. 8 is a schematic structural diagram of Embodiment 1 of a network device according to an embodiment of the present disclosure. As shown in FIG. 8, the network device includes: a receiving module 11 and a processing module 12.

The receiving module 11 is configured to receive first indication information and a resource request message that are sent by user equipment UE, where the first indication information is used to inform the network device that the UE is capable of sending data to at least one destination address in one resource scheduling period by using multiple time frequency resources; the resource request message is used to indicate, to the network device, destination addresses respectively corresponding to multiple pieces of first to-be-sent data of the UE and a data volume of each piece of first to-be-sent data; and the first to-be-sent data includes at least one piece of second to-be-sent data.

The processing module 12 is configured to allocate, to the UE according to the first indication information and the resource request message that are received by the receiving module 11, time frequency resources used by the UE to send at least two pieces of second to-be-sent data in the resource scheduling period.

The network device provided in this embodiment of the present disclosure may execute the foregoing method embodiment, and an implementation principle and a technical effect of the network device are similar to those in the method embodiment. Details are not described herein again.

Further, based on the foregoing embodiment, the resource request message carries the first indication information.

Optionally, the first indication information may be capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

The processing module 12 is specifically configured to: obtain, according to the capability indication information, the preset first maximum quantity of the time frequency resources that can be used by the UE in the resource scheduling period; and allocate, to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

The network device provided in this embodiment of the present disclosure may execute the foregoing method embodiment, and an implementation principle and a technical effect of the network device are similar to those in the method embodiment. Details are not described herein again.

Optionally, the first indication information may be resource information, the resource information is used to indicate, to the network device, a second maximum quantity of time frequency resources that can actually be used by the UE in the resource scheduling period, and the second maximum quantity is greater than one. Optionally, the first indication information may include capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period. The resource information may be information about a quantity of the multiple time frequency resources or information about a quantity of processes for performing D2D data sending by the UE.

When the first indication information is resource information or includes capability information and resource information, the processing module 12 is specifically configured to allocate, to the UE according to a minimum value of the second maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

The network device provided in this embodiment of the present disclosure may execute the foregoing method embodiment, and an implementation principle and a technical effect of the network device are similar to those in the method embodiment. Details are not described herein again.

Figure 9:
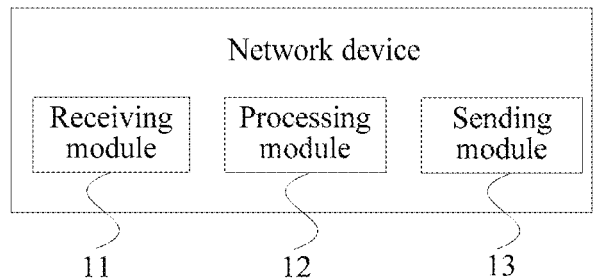
FIG. 9 is a schematic structural diagram of Embodiment 2 of a network device according to an embodiment of the present disclosure.

FIG. 9 is a schematic structural diagram of Embodiment 2 of a network device according to an embodiment of the present disclosure. Based on the embodiment shown in FIG. 8, as shown in FIG. 9, the network device may further include a sending module 13. The processing module 13 is specifically configured to: instruct, according to the first indication information and the resource request message, the sending module 13 to send second indication information to the UE; and allocate, to the UE, the time frequency resources used by the UE to send the at least two pieces of second to-be-sent data in the resource scheduling period, where the second indication information is used to indicate, to the UE, a mapping relationship between the time frequency resources allocated by the network device to the UE and a first destination address.

The network device provided in this embodiment of the present disclosure may execute the foregoing method embodiment, and an implementation principle and a technical effect of the network device are similar to those in the method embodiment. Details are not described herein again.

Figure 10:
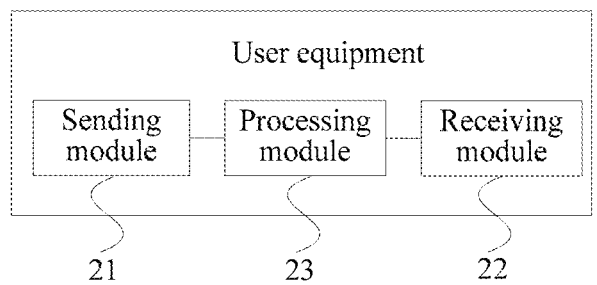
FIG. 10 is a schematic structural diagram of Embodiment 1 of user equipment according to an embodiment of the present disclosure.

FIG. 10 is a schematic structural diagram of Embodiment 1 of user equipment according to an embodiment of the present disclosure. As shown in FIG. 10, the user equipment includes: a sending module 21, a receiving module 22, and a processing module 23.

The sending module 21 is configured to send first indication information and a resource request message to a network device, where the first indication information is used to inform the network device that the user equipment UE is capable of sending data to at least one destination address in one resource scheduling period by using multiple time frequency resources; the resource request message is used to: indicate, to the network device, destination addresses respectively corresponding to multiple pieces of first to-be-sent data of the UE and a data volume of each piece of first to-be-sent data, and instruct the network device to allocate, to the UE according to the first indication information and the resource request message, time frequency resources used by the UE to send at least two pieces of second to-be-sent data in the resource scheduling period; and the first to-be-sent data includes at least one piece of second to-be-sent data.

The receiving module 22 is configured to receive the time frequency resources allocated by the network device.

The processing module 23 is configured to instruct, according to the time frequency resources received by the receiving module 22 and the destination addresses respectively corresponding to the multiple pieces of first to-be-sent data, the sending module 21 to send the at least two pieces of second to-be-sent data in the resource scheduling period.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, the resource request message carries the first indication information.

Optionally, the first indication information may be capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

Optionally, the first indication information may be resource information, the resource information is used to indicate, to the network device, a second maximum quantity of time frequency resources that can actually be used by the UE in the resource scheduling period, and the second maximum quantity is greater than one. The resource information may be information about a quantity of the multiple time frequency resources or information about a quantity of processes for performing D2D data sending by the UE.

Optionally, the first indication information may include capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period. The resource information may be information about a quantity of the multiple time frequency resources or information about a quantity of processes for performing D2D data sending by the UE.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, when the first indication information is capability information, that is, when the network device obtains, according to the capability indication information, the preset first maximum quantity of the time frequency resources that can be used by the UE in the resource scheduling period, and allocates, to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period, if a quantity of the time frequency resources that are allocated by the network device and that are received by the receiving module 22 is greater than a second maximum quantity of time frequency resources that can actually be used by the UE in the resource scheduling period, the processing module 23 is specifically configured to: select first time frequency resources from the time frequency resources according to a sequence in which the network device allocates the time frequency resources and the second maximum quantity; and instruct, according to the destination addresses respectively corresponding to the multiple pieces of first to-be-sent data, the sending module 21 to send the at least two pieces of second to-be-sent data on the first time frequency resources.

Further, based on the foregoing embodiment, when the sending module sends at least two pieces of second to-be-sent data in one resource scheduling period, the at least two pieces of sent second to-be-sent data may be corresponding to different destination addresses.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, the receiving module 22 is further configured to receive second indication information. The processing module 23 is specifically configured to instruct, according to the time frequency resources, the second indication information, and the destination addresses respectively corresponding to the multiple pieces of first to-be-sent data, the sending module 21 to send the at least two pieces of second to-be-sent data in the resource scheduling period, where the second indication information is used to indicate, to the UE, a mapping relationship between the time frequency resources allocated by the network device to the UE and a first destination address.

The user equipment provided in this embodiment of the present disclosure may execute the foregoing method embodiment, and an implementation principle and a technical effect of the user equipment are similar to those in the method embodiment. Details are not described herein again.

Figure 11:
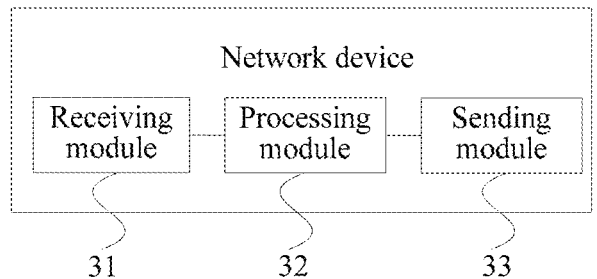
FIG. 11 is a schematic structural diagram of Embodiment 3 of a network device according to an embodiment of the present disclosure.

FIG. 11 is a schematic structural diagram of Embodiment 3 of a network device according to an embodiment of the present disclosure. As shown in FIG. 11, the network device includes: a receiving module 31, a processing module 32, and a sending module 33.

The receiving module 31 is configured to receive a resource request message sent by user equipment UE, where the resource request message is used to indicate, to the network device, a first destination address of the UE and a data volume of to-be-sent data corresponding to the first destination address.

The processing module 32 is configured to: determine, according to a preset condition, scheduling time and/or a frequency resource that are/is corresponding to the first destination address received by the receiving module 31; and instruct the sending module 33 to send scheduling information to the UE at the determined scheduling time and/or on the determined frequency resource that are/is corresponding to the first destination address, where the scheduling information is used to indicate, to the UE, a time frequency resource of the to-be-sent data corresponding to the first destination address of the UE.

The sending module 33 is configured to send, according to the scheduling time and/or the frequency resource that are/is corresponding to the first destination address and that are/is determined by the processing module 32, the scheduling information to the UE at the determined scheduling time and/or on the determined frequency resource that are/is corresponding to the first destination address.

The network device provided in this embodiment of the present disclosure may execute the foregoing method embodiment, and an implementation principle and a technical effect of the network device are similar to those in the method embodiment. Details are not described herein again.

Further, based on the foregoing embodiment, the preset condition may include a mapping relationship between the first destination address and the scheduling time and/or the frequency resource.

Optionally, the sending module 33 is further configured to: before sending the scheduling information at the determined scheduling time and/or on the determined frequency resource that are/is corresponding to the first destination address, send second indication information to the UE, where the second indication information is used to indicate, to the UE, the mapping relationship between the first destination address and the scheduling time and/or the frequency resource.

The network device provided in this embodiment of the present disclosure may execute the foregoing method embodiment, and an implementation principle and a technical effect of the network device are similar to those in the method embodiment. Details are not described herein again.

Figure 12:
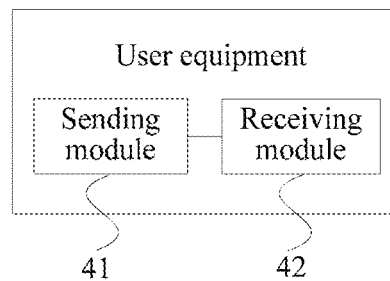
FIG. 12 is a schematic structural diagram of Embodiment 2 of user equipment according to an embodiment of the present disclosure.

FIG. 12 is a schematic structural diagram of Embodiment 2 of user equipment according to an embodiment of the present disclosure. As shown in FIG. 12, the user equipment includes: a sending module 41 and a receiving module 42.

The sending module 41 is configured to send a resource request message to a network device, where the resource request message is used to indicate, to the network device, a first destination address of the user equipment UE and a data volume of to-be-sent data corresponding to the first destination address.

The receiving module 42 is configured to receive scheduling information sent by the network device, where the scheduling information is used to indicate, to the UE, a time frequency resource of the to-be-sent data corresponding to the first destination address of the UE.

The sending module 41 is further configured to send, according to the scheduling information received by the receiving module 42 and a preset condition, the to-be-sent data corresponding to the first destination address in a resource scheduling period.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, the preset condition may include a mapping relationship between the first destination address and the scheduling time and/or the frequency resource.

Optionally, the receiving module 42 is further configured to: before receiving the scheduling information sent by the network device, receive second indication information sent by the network device, where the second indication information is used to indicate, to the UE, the mapping relationship between the first destination address and the scheduling time and/or the frequency resource.

The user equipment provided in this embodiment of the present disclosure may execute the foregoing method embodiment, and an implementation principle and a technical effect of the user equipment are similar to those in the method embodiment. Details are not described herein again.

Figure 13:
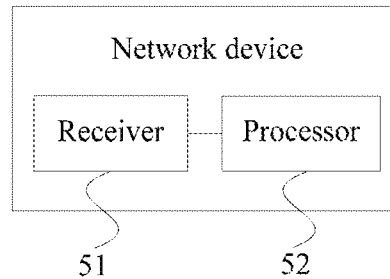
FIG. 13 is a schematic structural diagram of Embodiment 4 of a network device according to an embodiment of the present disclosure.

FIG. 13 is a schematic structural diagram of Embodiment 4 of a network device according to an embodiment of the present disclosure. As shown in FIG. 13, the network device includes: a receiver 51 and a processor 52.

The receiver 51 is configured to receive first indication information and a resource request message that are sent by user equipment UE, where the first indication information is used to inform the network device that the UE is capable of sending data to at least one destination address in one resource scheduling period by using multiple time frequency resources; the resource request message is used to indicate, to the network device, destination addresses respectively corresponding to multiple pieces of first to-be-sent data of the UE and a data volume of each piece of first to-be-sent data; and the first to-be-sent data includes at least one piece of second to-be-sent data.

The processor 52 is configured to allocate, to the UE according to the first indication information and the resource request message that are received by the receiver 51, time frequency resources used by the UE to send at least two pieces of second to-be-sent data in the resource scheduling period.

The network device provided in this embodiment of the present disclosure may execute the foregoing method embodiment, and an implementation principle and a technical effect of the network device are similar to those in the method embodiment. Details are not described herein again.

Further, based on the foregoing embodiment, the resource request message carries the first indication information.

Optionally, the first indication information may be capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period. The processor 52 is specifically configured to: obtain, according to the capability indication information, the preset first maximum quantity of the time frequency resources that can be used by the UE in the resource scheduling period; and allocate, to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

The network device provided in this embodiment of the present disclosure may execute the foregoing method embodiment, and an implementation principle and a technical effect of the network device are similar to those in the method embodiment. Details are not described herein again.

Optionally, the first indication information may be resource information, the resource information is used to indicate, to the network device, a second maximum quantity of time frequency resources that can actually be used by the UE in the resource scheduling period, and the second maximum quantity is greater than one. Optionally, the first indication information may include capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period. The resource information may be information about a quantity of the multiple time frequency resources or information about a quantity of processes for performing D2D data sending by the UE.

When the first indication information is resource information or includes capability information and resource information, the processor 52 is specifically configured to allocate, to the UE according to a minimum value of the second maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period.

The network device provided in this embodiment of the present disclosure may execute the foregoing method embodiment, and an implementation principle and a technical effect of the network device are similar to those in the method embodiment. Details are not described herein again.

Figure 14:
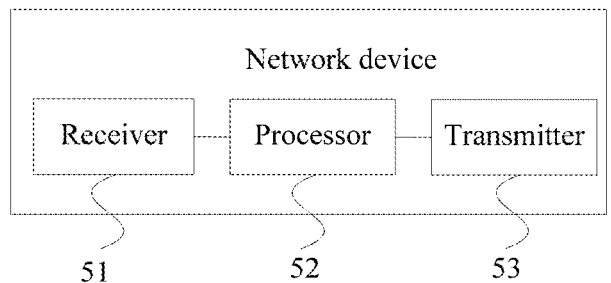
FIG. 14 is a schematic structural diagram of Embodiment 5 of a network device according to an embodiment of the present disclosure.

FIG. 14 is a schematic structural diagram of Embodiment 5 of a network device according to an embodiment of the present disclosure. Based on the embodiment shown in FIG. 13, as shown in FIG. 14, the network device may further include a transmitter 53. The processor 52 is specifically configured to: instruct, according to the first indication information and the resource request message, the transmitter 53 to send second indication information to the UE; and allocate, to the UE, the time frequency resources used by the UE to send the at least two pieces of second to-be-sent data in the resource scheduling period, where the second indication information is used to indicate, to the UE, a mapping relationship between the time frequency resources allocated by the network device to the UE and a first destination address.

The network device provided in this embodiment of the present disclosure may execute the foregoing method embodiment, and an implementation principle and a technical effect of the network device are similar to those in the method embodiment. Details are not described herein again.

Figure 15:
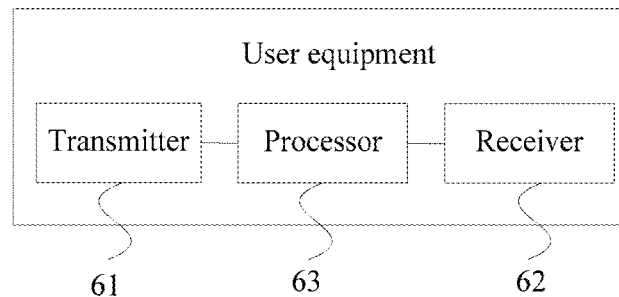
FIG. 15 is a schematic structural diagram of Embodiment 3 of user equipment according to an embodiment of the present disclosure.

FIG. 15 is a schematic structural diagram of Embodiment 3 of user equipment according to an embodiment of the present disclosure. As shown in FIG. 15, the user equipment includes: a transmitter 61, a receiver 62, and a processor 63.

The transmitter 61 is configured to send first indication information and a resource request message to a network device, where the first indication information is used to inform the network device that the user equipment UE is capable of sending data to at least one destination address in one resource scheduling period by using multiple time frequency resources; the resource request message is used to: indicate, to the network device, destination addresses respectively corresponding to multiple pieces of first to-be-sent data of the UE and a data volume of each piece of first to-be-sent data, and instruct the network device to allocate, to the UE according to the first indication information and the resource request message, time frequency resources used by the UE to send at least two pieces of second to-be-sent data in the resource scheduling period; and the first to-be-sent data includes at least one piece of second to-be-sent data.

The receiver 62 is configured to receive the time frequency resources allocated by the network device.

The processor 63 is configured to instruct, according to the time frequency resources received by the receiver 62 and the destination addresses respectively corresponding to the multiple pieces of first to-be-sent data, the transmitter 61 to send the at least two pieces of second to-be-sent data in the resource scheduling period.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, the resource request message carries the first indication information.

Optionally, the first indication information may be capability indication information, and the capability indication information is used to: inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

Optionally, the first indication information may be resource information, the resource information is used to indicate, to the network device, a second maximum quantity of time frequency resources that can actually be used by the UE in the resource scheduling period, and the second maximum quantity is greater than one. The resource information may be information about a quantity of the multiple time frequency resources or information about a quantity of processes for performing D2D data sending by the UE.

Optionally, the first indication information may include capability indication information and resource information, where the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period. The resource information may be information about a quantity of the multiple time frequency resources or information about a quantity of processes for performing D2D data sending by the UE.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, when the first indication information is capability information, that is, when the network device obtains, according to the capability indication information, the preset first maximum quantity of the time frequency resources that can be used by the UE in the resource scheduling period, and allocates, to the UE according to a minimum value of the first maximum quantity and a quantity of the destination addresses respectively corresponding to the multiple pieces of first to-be-sent data, and the data volume of each piece of first to-be-sent data, the time frequency resources used by the UE to send the at least two pieces of second to-be-sent data in the resource scheduling period, if a quantity of the time frequency resources that are allocated by the network device and that are received by the receiver 62 is greater than a second maximum quantity of time frequency resources that can actually be used by the UE in the resource scheduling period, the processor 63 is specifically configured to: select first time frequency resources from the time frequency resources according to a sequence in which the network device allocates the time frequency resources and the second maximum quantity; and instruct, according to the destination addresses respectively corresponding to the multiple pieces of first to-be-sent data, the transmitter 61 to send the at least two pieces of second to-be-sent data on the first time frequency resources.

Further, based on the foregoing embodiment, when the transmitter 61 sends at least two pieces of second to-be-sent data in one resource scheduling period, the at least two pieces of sent second to-be-sent data may be corresponding to different destination addresses.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, the receiver 62 is further configured to receive second indication information. The processor 63 is specifically configured to instruct, according to the time frequency resources, the second indication information, and the destination addresses respectively corresponding to the multiple pieces of first to-be-sent data, the transmitter 61 to send the at least two pieces of second to-be-sent data in the resource scheduling period, where the second indication information is used to indicate, to the UE, a mapping relationship between the time frequency resources allocated by the network device to the UE and a first destination address.

The user equipment provided in this embodiment of the present disclosure may execute the foregoing method embodiment, and an implementation principle and a technical effect of the user equipment are similar to those in the method embodiment. Details are not described herein again.

Figure 16:
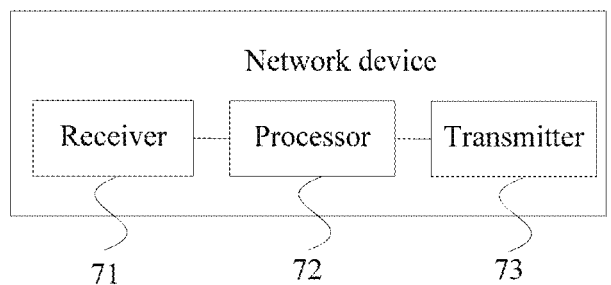
FIG. 16 is a schematic structural diagram of Embodiment 6 of a network device according to an embodiment of the present disclosure.

FIG. 16 is a schematic structural diagram of Embodiment 6 of a network device according to an embodiment of the present disclosure. As shown in FIG. 16, the network device includes: a receiver 71, a processor 72, and a transmitter 73.

The receiver 71 is configured to receive a resource request message sent by user equipment UE, where the resource request message is used to indicate, to the network device, a first destination address of the UE and a data volume of to-be-sent data corresponding to the first destination address.

The processor 72 is configured to: determine, according to a preset condition, scheduling time and/or a frequency resource that are/is corresponding to the first destination address received by the receiver 71; and instruct the transmitter to send scheduling information to the UE at the determined scheduling time and/or on the determined frequency resource that are/is corresponding to the first destination address, where the scheduling information is used to indicate, to the UE, a time frequency resource of the to-be-sent data corresponding to the first destination address of the UE.

The transmitter 73 is configured to send, according to the scheduling time and/or the frequency resource that are/is corresponding to the first destination address and that are/is determined by the processor 72, the scheduling information to the UE at the determined scheduling time and/or on the determined frequency resource that are/is corresponding to the first destination address.

The network device provided in this embodiment of the present disclosure may execute the foregoing method embodiment, and an implementation principle and a technical effect of the network device are similar to those in the method embodiment. Details are not described herein again.

Further, based on the foregoing embodiment, the preset condition may include a mapping relationship between the first destination address and the scheduling time and/or the frequency resource.

Optionally, the transmitter 73 is further configured to: before sending the scheduling information at the determined scheduling time and/or on the determined frequency resource that are/is corresponding to the first destination address, send second indication information to the UE, where the second indication information is used to indicate, to the UE, the mapping relationship between the first destination address and the scheduling time and/or the frequency resource.

The network device provided in this embodiment of the present disclosure may execute the foregoing method embodiment, and an implementation principle and a technical effect of the network device are similar to those in the method embodiment. Details are not described herein again.

Figure 17:
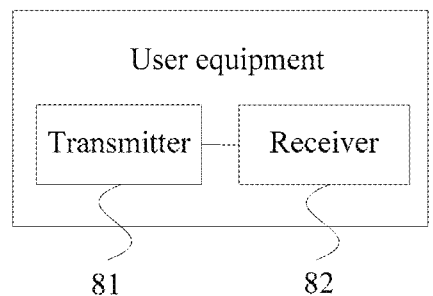
FIG. 17 is a schematic structural diagram of Embodiment 4 of user equipment according to an embodiment of the present disclosure.

FIG. 17 is a schematic structural diagram of Embodiment 4 of user equipment according to an embodiment of the present disclosure. As shown in FIG. 17, the user equipment includes: a transmitter 81 and a receiver 82.

The transmitter 81 is configured to send a resource request message to a network device, where the resource request message is used to indicate, to the network device, a first destination address of the user equipment UE and a data volume of to-be-sent data corresponding to the first destination address.

The receiver 82 is configured to receive scheduling information sent by the network device, where the scheduling information is used to indicate, to the UE, a time frequency resource of the to-be-sent data corresponding to the first destination address of the UE.

The transmitter 81 is further configured to send, according to the scheduling information received by the receiver 82 and a preset condition, the to-be-sent data corresponding to the first destination address in a resource scheduling period.

The user equipment provided in this embodiment of the present disclosure may execute the foregoing method embodiment, and an implementation principle and a technical effect of the user equipment are similar to those in the method embodiment. Details are not described herein again.

Further, based on the foregoing embodiment, the preset condition may include a mapping relationship between the first destination address and the scheduling time and/or the frequency resource.

Optionally, the receiver 82 is further configured to: before receiving the scheduling information sent by the network device, receive second indication information sent by the network device, where the second indication information is used to indicate, to the UE, the mapping relationship between the first destination address and the scheduling time and/or the frequency resource.

The user equipment provided in this embodiment of the present disclosure may execute the foregoing method embodiment, and an implementation principle and a technical effect of the user equipment are similar to those in the method embodiment. Details are not described herein again.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present disclosure shall be subject to the protection scope of the claims.

What is claimed is:

1. A data sending method, comprising:
receiving, by a network device, first indication information and a resource request message that are sent by user equipment (UE), wherein the first indication information is used to inform the network device that the UE is capable of sending data to at least one destination address in one resource scheduling period by using multiple time frequency resources, and the resource request message is used to indicate to the network device destination addresses respectively corresponding to multiple pieces of first to-be-sent data of the UE and a data volume of each piece of first to-be-sent data, and wherein the first to-be-sent data comprises at least one piece of second to-be-sent data; and
allocating, by the network device to the UE according to the first indication information and the resource request message, time frequency resources to use by the UE for sending at least two pieces of second to-be-sent data in the resource scheduling period.

2. The method according to claim 1, wherein the first indication information comprises capability indication information used to inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

3. The method according to claim 1, wherein the first indication information comprises capability indication information and resource information, wherein the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

4. The method according to claim 3, wherein the resource information comprises information about a quantity of the multiple time frequency resources or information about a quantity of processes for performing device-to-device (D2D) data sending by the UE.

5. A data sending method, comprising:
sending, by user equipment (UE), first indication information and a resource request message to a network device, the first indication information for informing the network device that the UE is capable of sending data to at least one destination address in one resource scheduling period by using multiple time frequency resources, the resource request message for indicating to the network device destination addresses respectively corresponding to multiple pieces of first to-be-sent data of the UE and a data volume of each piece of first to-be-sent data, and for instructing the network device to allocate, to the UE according to the first indication information and the resource request message, time frequency resources to be used by the UE for sending at least two pieces of second to-be-sent data in the resource scheduling period, and wherein the first to-be-sent data comprises at least one piece of second to-be-sent data;
receiving, by the UE, the time frequency resources allocated by the network device; and
sending, by the UE, the at least two pieces of second to-be-sent data in the resource scheduling period according to the time frequency resources and the destination addresses respectively corresponding to the multiple pieces of first to-be-sent data.

6. The method according to claim 5, wherein the first indication information comprises capability indication information for informing the network device that the UE has a capability of sending data to the at least one destination address in one resource scheduling period by using multiple time frequency resources, and for instructing the network device to obtain, according to the capability indication information, a preset first maximum quantity of time frequency resources that can be used by the UE in the resource scheduling period.

7. The method according to claim 5, wherein the first indication information comprises capability indication information and resource information, the capability indication information for informing the network device that the UE has a capability of sending data to the at least one destination address in one resource scheduling period by using multiple time frequency resources, and the resource information for indicating, to the network device, a second maximum quantity of time frequency resources that can actually be used by the UE in the resource scheduling period.

8. The method according to claim 5, wherein the resource information comprises information about a quantity of the multiple time frequency resources or information about a quantity of processes for performing device-to-device (D2D) data sending by the UE.

9. A network device, wherein the network device comprises:
   a receiver, configured to receive first indication information and a resource request message that are sent by user equipment (UE), wherein the first indication information is used to inform the network device that the UE is capable of sending data to at least one destination address in one resource scheduling period by using multiple time frequency resources, the resource request message is used to indicate, to the network device, destination addresses respectively corresponding to multiple pieces of first to-be-sent data of the UE and a data volume of each piece of first to-be-sent data, and wherein the first to-be-sent data comprises at least one piece of second to-be-sent data; and
   a processor, configured to allocate, to the UE according to the first indication information and the resource request message received by the receiver, time frequency resources used by the UE to send at least two pieces of second to-be-sent data in the resource scheduling period.

10. The network device according to claim 9, wherein the first indication information comprises capability indication information used to inform the network device that the UE has a capability of sending data to the at least one destination address in one resource scheduling period by using multiple time frequency resources, and instruct the network device to obtain, according to the capability indication information, a preset first maximum quantity of time frequency resources that can be used by the UE in the resource scheduling period.

11. The network device according to claim 9, wherein the first indication information comprises capability indication information and resource information, wherein the capability indication information is used to inform the network device that the UE has a capability of sending data to the at least one destination address in one resource scheduling period by using multiple time frequency resources, and the resource information is used to indicate, to the network device, a second maximum quantity of time frequency resources that can actually be used by the UE in the resource scheduling period.

12. The network device according to claim 9, wherein the resource information comprises information about a quantity of the multiple time frequency resources or information about a quantity of processes for performing device-to-device (D2D) data sending by the UE.

13. User equipment (UE), wherein the user equipment comprises:
   a transmitter, configured to send first indication information and a resource request message to a network device, the first indication information for informing the network device that the UE is capable of sending data to at least one destination address in one resource scheduling period by using multiple time frequency resources, the resource request message for indicating, to the network device, destination addresses respectively corresponding to multiple pieces of first to-be-sent data of the UE and a data volume of each piece of first to-be-sent data, and for instructing the network device to allocate, to the UE according to the first indication information and the resource request message, time frequency resources to be used by the UE for sending at least two pieces of second to-be-sent data in the resource scheduling period; and wherein the first to-be-sent data comprises at least one piece of second to-be-sent data;
   a receiver, configured to receive the time frequency resources allocated by the network device; and
   a processor, configured to instruct, according to the time frequency resources received by the receiver and the destination addresses respectively corresponding to the multiple pieces of first to-be-sent data, the transmitter to send the at least two pieces of second to-be-sent data in the resource scheduling period.

14. The user equipment according to claim 13, wherein the first indication information comprises capability indication information for informing the network device that the UE has a capability of sending data to the at least one destination address in one resource scheduling period by using multiple time frequency resources, and for instructing the network device to obtain, according to the capability indication information, a preset first maximum quantity of time frequency resources that can be used by the UE in the resource scheduling period.

15. The user equipment according to claim 13, wherein the first indication information comprises capability indication information and resource information, the capability indication information for informing the network device that the UE has a capability of sending data to the at least one destination address in one resource scheduling period by using multiple time frequency resources, the resource information for indicating, to the network device, a second maximum quantity of time frequency resources that can actually be used by the UE in the resource scheduling period.

* * * * *